United States Patent
Huang et al.

(10) Patent No.: US 12,444,655 B2
(45) Date of Patent: Oct. 14, 2025

(54) MACHINE LEARNING MODEL FOR SEMICONDUCTOR MANUFACTURING PROCESSES

(71) Applicant: Applied Materials, Inc., Santa Clara, CA (US)

(72) Inventors: Zhiqiang Huang, Singapore (SG); Li Ming Tan, Singapore (SG); Joanna Kejun Loh, Singapore (SG); Olivia Fatma Koentjoro, Waterford Residence (SG); Roger Alan Lindley, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 385 days.

(21) Appl. No.: 18/191,697

(22) Filed: Mar. 28, 2023

(65) Prior Publication Data

US 2024/0332092 A1    Oct. 3, 2024

(51) Int. Cl.
| | |
|---|---|
| *H01L 21/66* | (2006.01) |
| *G05B 13/02* | (2006.01) |
| *G05B 13/04* | (2006.01) |
| *G05B 19/401* | (2006.01) |
| *G06F 30/3308* | (2020.01) |
| *G06F 30/337* | (2020.01) |
| *H01L 21/67* | (2006.01) |

(52) U.S. Cl.
CPC .......... *H01L 22/12* (2013.01); *G05B 13/0265* (2013.01); *G05B 13/048* (2013.01); *G05B 19/401* (2013.01); *G06F 30/3308* (2020.01); *G06F 30/337* (2020.01); *H01L 21/67* (2013.01)

(58) Field of Classification Search
CPC ....... H01L 22/12; H01L 21/67; G05B 13/048; G05B 13/0265; G05B 19/401; G06F 30/337; G06F 30/3308
USPC .......................................................... 700/121
See application file for complete search history.

(56) References Cited

U.S. PATENT DOCUMENTS

| | | | |
|---|---|---|---|
| 9,240,360 B2 * | 1/2016 | Baseman | G05B 19/41875 |
| 11,158,526 B2 | 10/2021 | Parkhe et al. | |
| 11,533,783 B2 * | 12/2022 | Cimino | H01L 21/67103 |

(Continued)

FOREIGN PATENT DOCUMENTS

| | | | | |
|---|---|---|---|---|
| CN | 114127904 A | | 3/2022 | |
| CN | 114883214 A | * | 8/2022 | ....... H01L 21/67253 |
| WO | 2013/033381 A2 | | 3/2013 | |

OTHER PUBLICATIONS

International Search Report and Written Opinion for International Application No. PCT/US2024/016367 dated Jun. 10, 2024.

*Primary Examiner* — Ronald D Hartman, Jr.
(74) *Attorney, Agent, or Firm* — Patterson + Sheridan, LLP

(57) ABSTRACT

The disclosure describes methods and systems for training and deploying a machine learning predictive model for use in a semiconductor manufacturing process. Specifically, the present disclosure provides for training machine learning predictive models for manufacturing components using design data, process parameters, gas flow configurations from a pixelated showerhead, temperature profile across an electrostatic chuck, and measured uniformity profiles of processed wafers. The present disclosure also provides for deploying the machine learning predictive model to effectuate real-time adjustments to a manufacturing process.

25 Claims, 12 Drawing Sheets

(56) References Cited

U.S. PATENT DOCUMENTS

| | | | |
|---|---|---|---|
| 2018/0182632 A1* | 6/2018 | Feng | H01L 22/00 |
| 2020/0037399 A1 | 1/2020 | Zhang et al. | |
| 2022/0066411 A1* | 3/2022 | Ummethala | G06N 20/20 |
| 2022/0334554 A1* | 10/2022 | Feng | H01L 22/12 |
| 2022/0336294 A1* | 10/2022 | Yang | H01L 22/12 |
| 2022/0374572 A1* | 11/2022 | Sawlani | G06N 20/00 |
| 2024/0096713 A1* | 3/2024 | Zhang | H01L 21/67253 |
| 2024/0329626 A1* | 10/2024 | Ng | G05B 19/41885 |

\* cited by examiner

MACHINE LEARNING MODEL FOR SEMICONDUCTOR MANUFACTURING PROCESSES

TECHNICAL FIELD

Embodiments of the present disclosure relate, in general, to manufacturing systems, and more particularly to control of semiconductor processing systems using machine learning.

BACKGROUND

Semiconductor wafer processing complexity has been increasing as the device size has been shrinking. A typical process has multiple different steps, with some advanced processes, such as plasma etching, having twenty or even more steps. Each step has a multitude of knobs associated to optimize performance. Therefore, the space available to tune and optimize a given process is theoretically extremely large.

Process engineers use their experience and expertise to select a preliminary baseline process and fine-tune the process based on a limited number of wafers (or portions of wafers, referred to as coupons) dedicated for design of experiment (DoE). The goal of DoE is to tailor the process to achieve desired specification on a wafer. However, dedicating full wafers or portions of wafers for DoE data collection consumes valuable resources. Therefore, often the adopted process may be a viable one, but not necessarily the optimum solution.

In addition, the quality and consistency of substrates processed at the manufacturing system may drift away from the target quality and consistency associated with the process recipe over time. However, it may be difficult for an operator of the manufacturing system to identify a drift from the target quality and consistency, to determine the defective component that is causing the drift, and determine an appropriate action to address the drift in quality and consistency.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

[This section will be completed upon approval of the claims]

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of the scope of the disclosure, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
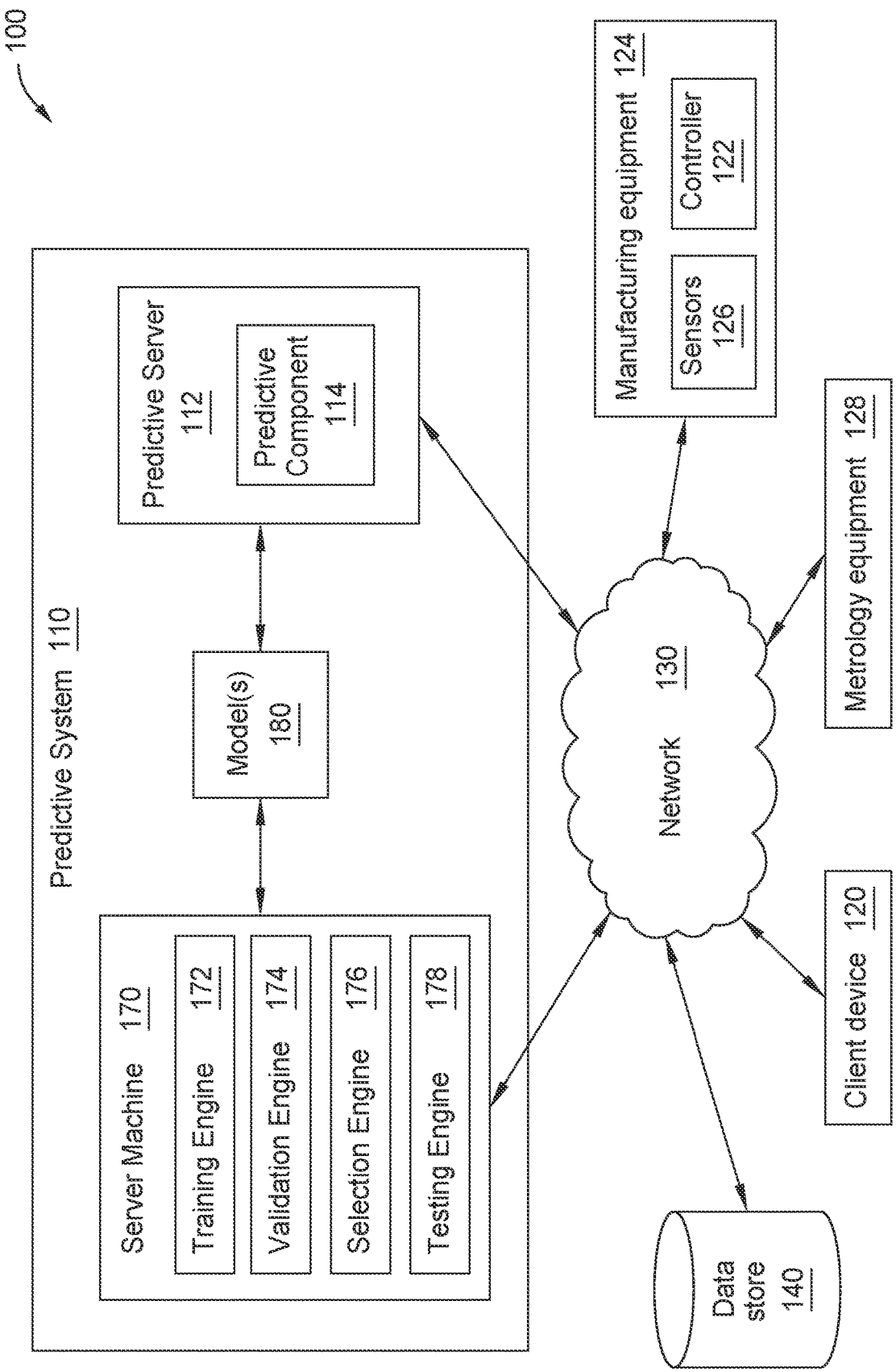
FIG. 1 depicts an exemplary computer system.

Implementations described herein provide for machine learning enhanced operations for a pixelated-control of temperature for a substrate support such as an electrostatic chuck (ESC); a pixelated-control of gas flow for a showerhead; a pixelated-control of localized power for the generation of localized plasma, such as through the substrate support; and/or a pixelated-control of localized power for the generation of localized plasma through an upper electrode, such as an electrode in a showerhead or process chamber lid. A machine learning model can be trained for each particular process performed in a processing chamber of a manufacturing process. A machine learning model can also be trained for processes performed by a particular manufacturing component, such as processes performed by a pixelated showerhead or an electrostatic chuck in a processing chamber. The trained machine learning model can generate a predicted uniformity profile as an output of an inputted process recipe and tunable process parameters. The predicted uniformity profile can be compared to measured metrology data for each particular process to train the machine learning model.

Once trained, the machine learning model can be deployed to predict a uniformity profile as an output of a process recipe, tunable process parameters, and real-time metrology measurement data while the process is ongoing. The predicted uniformity profile can be further used by the machine learning model to determine whether any adjustments are warranted to the tunable process parameters before the manufacturing process ends, or whether there is any potential malfunction in the manufacturing process or equipment.

Deviations from a target process (e.g., due to process drift) may be detected based on a drift of metrology measurement values for a set of substrates processed at the manufacturing system according to the process recipe from a target metrology measurement value. A metrology measurement value may include an etch rate (i.e., a rate at which a certain material on the surface of the substrate is etched in a processing chamber), an etch rate uniformity (i.e., a variation of an etch rate at two or more portions of the surface of the substrate), a deposition thickness uniformity (i.e., a variation of a thickness of deposited substances at two or more portion of the surface of the substrate), a critical dimension (i.e., a unit of measurement for measuring a dimension of elements of a substrate, such as lines, columns, openings, spaces, etc.), critical dimension uniformity (i.e., a variation of critical dimensions across a surface of a substrate), edge to edge placement error (EPE) (i.e., a difference between the intended and resulting features included on a surface of a substrate), and so forth.

A processing device (e.g., a system controller for the manufacturing system) may receive data associated with processing a set of substrates at a manufacturing system according to a process recipe. The data may be received from sensors at various stations of a manufacturing system. For example, the processing device may receive data from sensors at a processing chamber, a transfer chamber, a load lock, a factory interface, and so forth. In some embodiments, the processing device may receive, from a substrate measurement sub-system, data associated with the substrates before or after the substrates are processed at the manufacturing system. For example, the processing device may receive spectral data associated with a profile of each substrate after each substrate is etched at a processing chamber.

The processing device may provide the data associated with processing the set of substrates and/or the data associated with the substrate before or after the substrates are processed as input into the trained machine learning model and obtain one or more outputs from the machine learning model. In some embodiments, the processing device may also provide a set of metrology measurement values (e.g., an etch rate, an etch rate uniformity, a deposition thickness uniformity, a critical dimension, a critical dimension uniformity, edge to edge placement error, etc.) for the set of substrates as input to the machine learning model. For example, the processing device may determine each of the set of metrology measurement values based on spectral or non-spectral data received from the substrate measurement subsystem. In another example, the processing device may receive each of the set of metrology measurement values from a metrology system coupled to the manufacturing system.

The processing device may determine, from the output of the machine learning model, an amount of drift of the set of metrology measurement values for the set of substrates from a target metrology measurement value. The processing device may also determine process recipe modification data that identifies one or more modifications to the process recipe. A modification for the process recipe may include modifying an operation of the particular process recipe or generating an instruction to terminate execution of the process recipe for a subsequent set of substrates to be processed at the manufacturing system. The process recipe modification data may also include an indication of a level of confidence that a respective modification to the process recipe satisfies a drift criterion for a second set of substrates. The processing device may determine that a modification to the process recipe satisfies a drift criterion in response to determining the respective modification is predicted to reduce an amount of substrate process drift for a set of substrates subsequently processed at the manufacturing system. The processing device may identify a respective modification having a level of confidence that satisfies a confidence criterion and update the process recipe based on the identified modification.

In some embodiments, the process recipe modification data can include an indication of one or more stations of the manufacturing system that include a defect that is the cause of the substrate process drift. In such embodiments, the processing device can transmit a notification to a user of the manufacturing system (e.g., an operator) including an indication of the one or more stations including the defect. In some embodiments, the indication can include a particular component of the one or more stations that includes the defect. The notification can be transmitted to the user of the manufacturing system with prediction for the respective modification to the process recipe, in some embodiments.

In addition, aspects of the present disclosure are directed to optimizing processing operations of one or more of a pixelated electrostatic chuck, generation of pixelated plasma, and use of a pixelated showerhead in a process via one or more machine learning models. During the research and development phase, the disclosed systems and methods provide for faster convergence to target process recipes using only a limited number of test wafers. During production ramp leading to high volume manufacturing (HVM), the disclosed systems and methods enables tighter control of the process window not only intra-wafer, but also between wafers in a single lot (wafer-to-wafer control), or between different lots of wafers (lot-to-lot control). The process control frequency and frequency of model adaptation may vary depending on whether it is wafer-to-wafer (higher frequency), lot-to-lot (medium frequency) or PM-to-PM (i.e. once at each periodic maintenance (PM)).

Examples of the semiconductor processing equipment may include, but are not limited to, advanced plasma etchers. As an illustration, a typical plasma etch process may have more than twenty steps, and there may be twenty or more knobs available to control each process step by controlling various process parameters that can be varied (also known as process variables). Examples of process variables for an etch step that can be controlled by an associated knob may include plasma radio frequency (RF) power, pressure, temperature, composition and proportion of gases in the gas mixtures used to generate the plasma, etc. The settings of the knobs affect density of radicals or ions in plasma and other factors that define the process. Persons skilled in the art would readily appreciate that the process space available to tune and optimize a given process is extremely large and it is practically impossible to explore the entire process space empirically within any reasonable process qualification time frame, let alone being able to perform multi-dimensional process space optimization as an abstract concept.

Furthermore, due to the interaction between the knobs and their impact on the process performance, it is extremely hard to predict the combined effect of simultaneous knob control by manually scanning one knob at a time. This task becomes even more complicated for a large number of steps in a single process, or when multiple processes (each process having its associated steps) are involved.

Process engineers recognize that huge windows of operation cannot be covered by manual optimization. However, to achieve acceptable levels of performance, process engineers rely on prior experience to choose an initial process based on existing knowledge, and adjust a few knobs (i.e., fewer than a full set of available knobs) within a process space in an attempt to control variation of one or more feature-level dimensions of interest. The knowledge-based initial process may be a baseline process, but does not have to be a baseline process.

One of the advantages of the present disclosure is that it complements and expands the capability of process engineers significantly by enabling machine-learning-based intelligent process optimization, allowing digital scanning of a large set of knobs across the entire process space. Initially, a model is built using metrology data from diverse sources, e.g., on-tool metrology, and off-tool metrology. This model is used for process optimization during the research and development phase. Later, the model is used to maintain and control a tight process window during high volume manufacturing.

FIG. 1 depicts an illustrative computer system architecture 100, according to aspects of the present disclosure. In some embodiments, computer system architecture 100 may be included as part of a manufacturing system for processing substrates, such as manufacturing system 200 of FIG. 2. Computer system architecture 100 includes a client device 120, manufacturing equipment 124, metrology equipment 128, a predictive server 112 (e.g., to generate predictive data, to provide model adaptation, to use a knowledge base, etc.), and a data store 140. The predictive server 112 may be part of a predictive system 110. The predictive system 110 may further include server machine 170. In various embodiments, computer system architecture 100 may include fewer or additional components than those depicted in the exemplary figure.

The manufacturing equipment 124 may include sensors 126 configured to capture data for a substrate being processed at the manufacturing system, and a controller 122. In some embodiments, the manufacturing equipment 124 and sensors 126 may be part of a sensor system that includes a sensor server (e.g., field service server (FSS) at a manufacturing facility) and sensor identifier reader (e.g., front opening unified pod (FOUP) radio frequency identification (RFID) reader for sensor system). In some embodiments, metrology equipment 128 may be part of a metrology system that includes a metrology server (e.g., a metrology database, metrology folders, etc.) and metrology identifier reader (e.g., FOUP RFID reader for metrology system).

Manufacturing equipment 124 may produce products following a recipe or performing runs over a period of time via controller 122. While there may be multiple controllers for different parts of manufacturing equipment 124, a generic controller 122 is depicted in the exemplary figure for simplicity. Manufacturing equipment 124 may include a substrate measurement subsystem that includes one or more sensors 126 configured to generate spectral data and/or positional data for a substrate embedded within the substrate measurement subsystem. Sensors 126 that are configured to generate spectral data (herein referred to as spectra sensing components) may include reflectometry sensors, ellipsometry sensors, thermal spectra sensors, capacitive sensors, and so forth. In some embodiments, spectra sensing components may be included within the substrate measurement subsystem or another portion of the manufacturing system. One or more sensors 126 (e.g., eddy current sensors, etc.) may also be configured to generate non-spectral data for the substrate. Further details regarding manufacturing equipment 124 and the substrate measurement subsystem are provided with respect to FIG. 2 and FIG. 3.

In some embodiments, sensors 126 may provide sensor data associated with manufacturing equipment 124, and provide inputs to predictive system 110, and/or a controller of manufacturing equipment 124. Sensor data may include a value of one or more of temperature (e.g., heater temperature, gas temperature, and/or ambient temperature), spacing (SP), pressure, high frequency radio frequency (HFRF), voltage of electrostatic chuck (ESC), electrical current, flow rate of one or more substances present in manufacturing equipment, power, voltage, etc. Sensor data may be associated with or indicative of manufacturing parameters such as hardware parameters, such as settings or components (e.g., size, type, etc.) of the manufacturing equipment 124, or process parameters of the manufacturing equipment 124. The sensor data may be provided while the manufacturing equipment 124 is performing manufacturing processes (e.g., equipment readings when processing products). The sensor data 142 may be different for each substrate.

Metrology equipment 128 may provide metrology data associated with substrates (e.g., wafers, etc.) processed by manufacturing equipment 124. The metrology data may include a value of one or more of film property data (e.g., wafer spatial film properties), dimensions (e.g., thickness, height, etc.), dielectric constant, dopant concentration, density, defects, etc. In some embodiments, the metrology data may further include a value of one or more surface profile property data (e.g., an etch rate, an etch rate uniformity, a critical dimension of one or more features included on a surface of the substrate, a critical dimension uniformity across the surface of the substrate, an edge placement error, etc.). The metrology data may be of a finished or semi-finished product. The metrology data may be different for each substrate.

Metrology equipment 128 may include on-tool metrology and off-tool metrology. On-tool metrology can include measurements performed on the devices themselves within a die or on test structures having features similar to the devices. Depending on the measurement techniques used, the test structures may include, but are not limited to, structures similar to logic or memory devices that are on the wafers. Collectively, on-tool metrology performed on devices or test structures is referred to as "on-board metrology" (OBM).

OBM can be based on optical measurements (e.g., collecting optical emission spectra in-situ from devices or test structures, or macro 2D mapping using optical targets) or other types of measurements. These optical or other measurements can be inside the chamber (in-situ), or outside the chamber (ex-situ), but still under vacuum, or, at the factory interface (not necessarily under vacuum) on a process platform that may have multiple chambers. One such example is integrated metrology, such as optical critical dimension (OCD). The term "platform" broadly encompasses a system including multiple process and/or metrology tools which are all identical or some of the tools may be different from the others. For example a platform may have multiple process chambers performing the same process, or may have some chambers where one process (e.g., etch) is performed, and other chambers where a different process (e.g. deposition) is performed. In some other embodiments, a platform may include different types of process chambers (e.g., conductor or dielectric etch). A platform may also include metrology tools. Persons skilled in the art would appreciate that the scope of the disclosure is not limited by the configuration of the chamber and/or the platform.

Another type of on-tool metrology is referred to as "virtual metrology" (VM), which includes data collected from various sensors in the chamber or outside the chamber, but within the same platform. VM can include time traces of various process variables, such as pressure, temperature, RF power, current, voltage, flow control position, etc.

Off-tool metrology may include in-line metrology (e.g., e-beam inspection and metrology). "In-line metrology" broadly encompasses measurements that may be performed outside of a processing chamber, but without having to take the wafer out of the production line. An example of in-line metrology is scanning electron microscope (SEM), the advanced versions of which may offer high precision and broad modality. Advanced SEMs may include back-scattered electron (BSE) sensors in addition to secondary emission detectors, and ability to measure electron emission at various tilt angles and various landing energy, ranging from hundreds of electron-volt to tens of kilo electron-volts. SEMs have the capability of creating a broad database of metrology data in a non-destructive manner. SEM-based in-line metrology customized with e-beam simulation, data collection, image characterization and feature extraction as well as statistical analysis may be referred to as "customized metrology." Advanced SEM tool may be used as the foundation of high-precision, non-destructive three-dimensional feature level profiling which is at the heart of customized metrology.

Off-tool metrology may also include data available from any additional non-inline or off-line metrology, such as TEM, previously performed on a similar set of devices. The model uses machine-learning algorithms to combine all the data and extract meaningful relationships between metrology of dimensions of interest and various knobs that control the process.

The client device 120 may include a computing device such as personal computers (PCs), laptops, mobile phones, smart phones, tablet computers, netbook computers, network connected televisions ("smart TVs"), network-connected media players (e.g., Blu-ray player), a set-top box, over-the-top (OTT) streaming devices, operator boxes, etc. In some embodiments, the metrology data may be received from the client device 120. Client device 120 may display a graphical user interface (GUI), where the GUI enables the user to provide, as input, metrology measurement values for substrates processed at the manufacturing system.

Data store 140 may be a memory (e.g., random access memory), a drive (e.g., a hard drive, a flash drive), a database system, or another type of component or device capable of storing data. Data store 140 may include multiple storage components (e.g., multiple drives or multiple databases) that may span multiple computing devices (e.g., multiple server computers). The data store 140 may store data associated with processing a substrate at manufacturing equipment 124. For example, data store 140 may store data collected by sensors 126 at manufacturing equipment 124 before, during, or after a substrate process (referred to as process data). Process data can refer to historical process data (e.g., process data generated for a previous substrate processed at the manufacturing system) and/or current process data (e.g., process data generated for a current substrate processed at the manufacturing system). Data store 140 may also store spectral data or nonspectral data associated with a portion of a substrate processed at manufacturing equipment 124. Spectral data may include historical spectral data and/or current spectral data. Current process data and/or current spectral data may be data for which predictive data is generated. In some embodiments, data store 140 may store metrology data including historical metrology data (e.g., metrology measurement values for a prior substrate processed at the manufacturing system).

The data store 140 may also store contextual data associated with one or more substrates processed at the manufacturing system. Contextual data can include a recipe name, recipe step number, preventive maintenance indicator, operator, etc. In some embodiments, contextual data can also include an indication of a difference between two or more process recipes or process steps. For example, a first process recipe can include an operation including setting an internal temperature of a process chamber to 100° C. A second process recipe can include a corresponding operation including setting the internal temperature of the process chamber to 110° C. Contextual data can include an indication of a difference of the internal temperature of the process chamber between the first process recipe and the second process recipe.

In some embodiments, predictive system 110 includes server machine 170. Server machine 170 may include a training engine 172, a validation engine 174, a selection engine 176, and/or a testing engine 178. An engine may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. Training engine 172 may be capable of training a machine learning model(s) 180. The machine learning model(s) 180 may refer to the model artifact that is created by the training engine 172 using the training data that includes training inputs and corresponding target outputs (correct answers for respective training inputs). The training engine 172 may find patterns in the training data that map the training input to the target output (the answer to be predicted), and provide the machine learning model(s) 180 that captures these patterns. The machine learning model(s) 180 may use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), etc.

The validation engine 174 may be capable of validating a trained machine learning model(s) 180 using a corresponding set of features of a validation set from a training set. The validation engine 174 may determine an accuracy of each of the trained machine learning models 180 based on the corresponding sets of features of the validation set. The validation engine 174 may discard a trained machine learning model(s) 180 that has an accuracy that does not meet a threshold accuracy. In some embodiments, the selection engine 176 may be capable of selecting a trained machine learning model(s) 180 that has an accuracy that meets a threshold accuracy. In some embodiments, the selection engine 176 may be capable of selecting the trained machine learning model(s) 180 that has the highest accuracy of the trained machine learning models 180.

In exemplary embodiments, server machine 170 trains and generates a different machine learning model(s) 180 for each process that is conducted in a processing chamber of manufacturing equipment 124. Each process has its own tunable parameters (such as gas flow configuration), fixed parameters (such as process chamber pressure, temperature, power, etc.), and specific metrology tools utilized for monitoring the process. In some embodiments, process chamber conditions (such as pressure, temperature, power, etc) can also be tunable for a particular process. For each specific process, server machine 170 may generate a different machine learning model which can then be stored in data store 140. At process run time, selection engine 176 selects the relevant machine learning model for the particular process that is to be operated in a processing chamber of manufacturing equipment 124, and deploys the model via an inferencing system of the predictive server 112 to generate predictive component 114.

The testing engine 178 may be capable of testing a trained machine learning model(s) 180 using a corresponding set of features of a testing set from a training set generator. For example, a first trained machine learning model(s) 180 that was trained using a first set of features of the training set may be tested using the first set of features of the testing set. The testing engine 178 may determine a trained machine learning model(s) 180 that has the highest accuracy of all of the trained machine learning models based on the testing sets.

Predictive server 112 includes a predictive component 114 that is capable of providing data associated with processing each of a set of substrates at a manufacturing system according to a process recipe as input into trained machine learning model(s) 180 and running trained machine learning model(s) 180 on the input to obtain one or more outputs. Predictive component 114 is also sometimes referred to herein for simplicity as a predicted "uniformity profile". However, it is to be understood that the particular predicted component 114 may vary, depending on the particular process that is conducted in a processing chamber of manufacturing equipment 124. Further, as described in detail below, in some embodiments, predictive component 114 is also capable of determining process recipe modification data from the output of the trained machine learning model(s) 180 and using the process recipe modification data to predict a modification to process recipe for a current substrate being processed at the manufacturing system that satisfies a drift criterion.

The client device 120, manufacturing equipment 124, sensors 126, metrology equipment 128, predictive server 112, data store 140, and server machine 170 may be coupled to each other via a network 130. In some embodiments, network 130 is a public network that provides client device 120 with access to predictive server 112, data store 140, and other publically available computing devices. In some embodiments, network 130 is a private network that provides client device 120 access to manufacturing equipment 124, metrology equipment 128, data store 140, and other privately available computing devices. Network 130 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

It should be noted that in some other implementations, the functions of server machine 170, as well as predictive server 112, may be provided by a fewer number of machines. For example, in some embodiments, server machine 170 and predictive server 112 may be integrated into a single machine.

In general, functions described in one implementation as being performed by server machine 170, and/or predictive server 112 may also be performed on client device 120. In addition, the functionality attributed to a particular component may be performed by different or multiple components operating together.

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Figure 2:
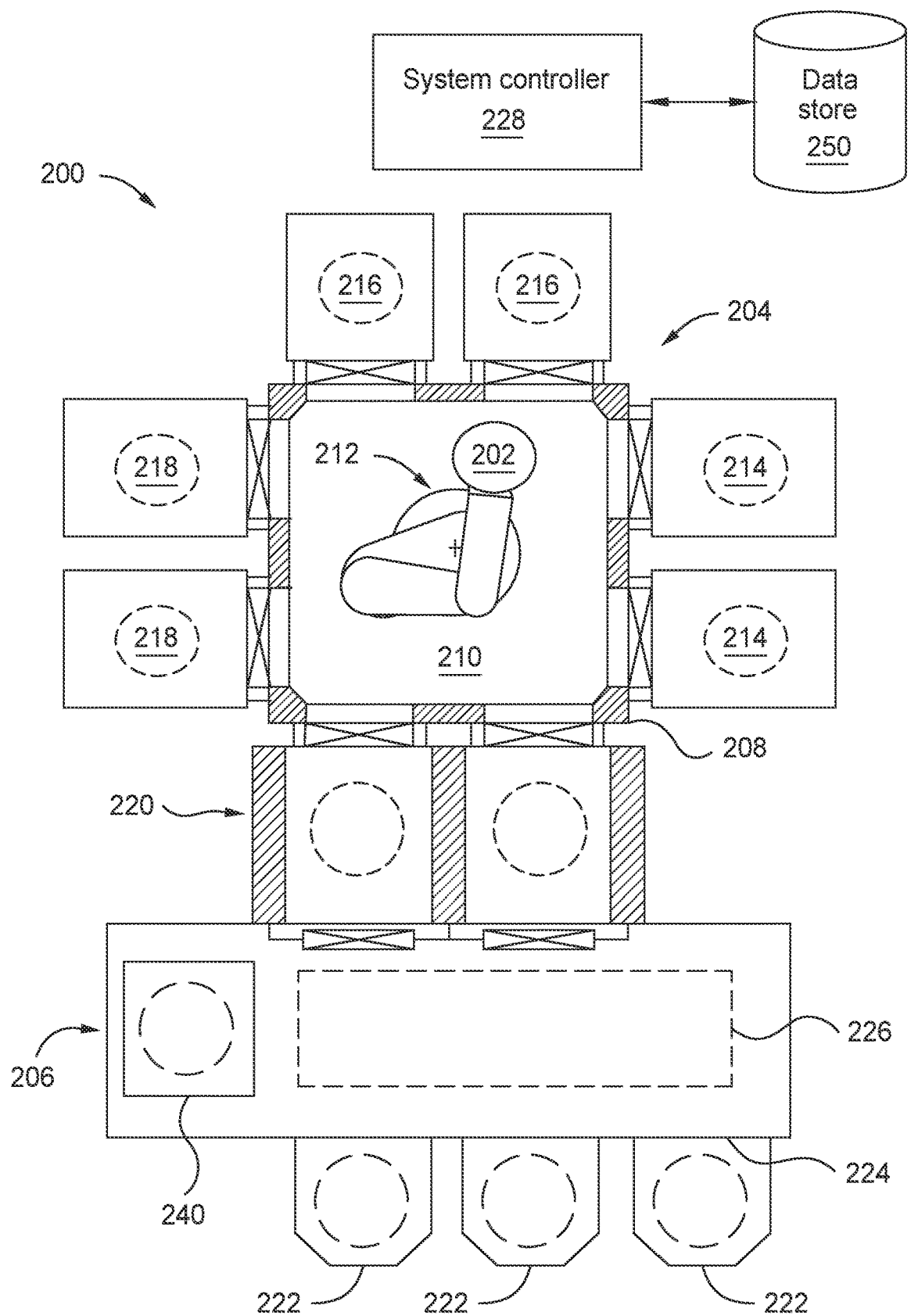
FIG. 2 depicts a top schematic view of an example manufacturing system.

FIG. 2 is a top schematic view of an example manufacturing system 200, according to aspects of the present disclosure. Manufacturing system 200 may perform one or more processes on a substrate 202. Substrate 202 may be any suitably rigid, fixed-dimension, planar article, such as, e.g., a silicon-containing disc or wafer, a patterned wafer, a glass plate, or the like, suitable for fabricating electronic devices or circuit components thereon.

Manufacturing system 200 may include a process tool 204 and a factory interface 206 coupled to process tool 204. Process tool 204 may include a housing 208 having a transfer chamber 210 therein. Transfer chamber 210 may include one or more processing chambers (also referred to as process chambers) 214, 216, 218 disposed therearound and coupled thereto. Processing chambers 214, 216, 218 may be coupled to transfer chamber 210 through respective ports, such as slit valves or the like. Transfer chamber 210 may also include a transfer chamber robot 212 configured to transfer substrate 202 between process chambers 214, 216, 218, load lock 220, etc. Transfer chamber robot 212 may include one or multiple arms where each arm includes one or more end effectors at the end of each arm. The end effector may be configured to handle particular objects, such as wafers.

Processing chambers 214, 216, 218 may be adapted to carry out any number of processes on substrates 202. A same or different substrate process may take place in each processing chamber 214, 216, 218. A substrate process may include atomic layer deposition (ALD), physical vapor deposition (PVD), chemical vapor deposition (CVD), etching, annealing, curing, pre-cleaning, metal or metal oxide removal, or the like. In some embodiments, a substrate process may include a combination of two or more of atomic layer deposition (ALD), physical vapor deposition (PVD), chemical vapor deposition (CVD), etching, annealing, curing, precleaning, metal or metal oxide removal, or the like. Other processes may be carried out on substrates therein. Processing chambers 214, 216, 218 may each include one or more sensors configured to capture data for substrate 202 before, after, or during a substrate process. For example, the one or more sensors may be configured to capture spectral data and/or non-spectral data for a portion of substrate 202 during a substrate process. In other or similar embodiments, the one or more sensors may be configured to capture data associated with the environment within processing chamber 214, 216, 218 before, after, or during the substrate process. For example, the one or more sensors may be configured to capture data associated with a temperature, a pressure, a gas concentration, etc. of the environment within processing chamber 214, 216, 218 during the substrate process.

A load lock 220 may also be coupled to housing 208 and transfer chamber 210. Load lock 220 may be configured to interface with, and be coupled to, transfer chamber 210 on one side and factory interface 206. Load lock 220 may have an environmentally-controlled atmosphere that may be changed from a vacuum environment (wherein substrates may be transferred to and from transfer chamber 210) to an inert-gas environment at or near atmospheric-pressure (wherein substrates may be transferred to and from factory interface 206) in some embodiments. Load lock 220 may include one or more sensors to capture data associated with substrate 202 before, after, or during a substrate process at processing chambers 214, 216, 218. For example, load lock 220 may include a vibration sensor (e.g., a piezoelectric sensor) configured to detect and monitor an amount of vibration occurring within load lock 220 during a substrate process at processing chambers 214,216,218. In another example, load lock 220 may include a temperature sensor (e.g., an infrared camera) to detect and monitor a temperature of load lock 220 during a substrate process. It should be noted that, although embodiments of the present disclosure describe sensors such as a vibration sensor or a temperature sensor at load lock 220 to monitor a state of load lock 220 during a substrate process, any type of sensor can be used at any station of the manufacturing system to monitor the state and/or health of the station during a substrate process.

Factory interface 206 may be any suitable enclosure, such as, e.g., an Equipment Front End Module (EFEM). Factory interface 206 may be configured to receive substrates 202 from substrate carriers 222 (e.g., Front Opening Unified Pods (FOUPs)) docked at various load ports 224 of factory interface 206. A factory interface robot 226 (shown dotted) may be configured to transfer substrates 202 between carriers 222 (also referred to as containers) and load lock 220.

Carriers 222 may be a substrate storage carrier or a replacement part storage carrier. Factory interface 206 and/or carriers 222 may include one or more sensors (e.g., a vibration sensor, a temperature sensor, etc.) to capture data associated with substrate 202 before, after, or during a substrate process at processing chambers 214, 216, 218, in accordance with previously described embodiments.

Manufacturing system 200 may also be connected to a client device (not shown) that is configured to provide information regarding manufacturing system 200 to a user (e.g., an operator). In some embodiments, the client device may provide information to a user of manufacturing system 200 via one or more graphical user interfaces (GUIs). For example, the client device may provide information regarding one or more modifications to be made to a process recipe for a substrate 202 via a GUI.

Manufacturing system 200 may also include a system controller 228. System controller 228 may be and/or include a computing device such as a personal computer, a server computer, a programmable logic controller (PLC), a microcontroller, and so on. System controller 228 may include one or more processing devices, which may be general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device may also be one or more special-purpose processing devices such as an application specific integrated circuit (ASIC), a field programmable gate array (FPGA), a digital signal processor (DSP), network processor, or the like. System controller 228 may include a data storage device (e.g., one or more disk drives and/or solid state drives), a main memory, a static memory, a network interface, and/or other components. System controller 228 may execute instructions to perform any one or more of the methodologies and/or embodiments described herein. In some embodiments, system controller 228 may execute instructions to perform one or more operations at manufacturing system 200 in accordance with a process recipe. The instructions may be stored on a computer readable storage medium, which may include the main memory, static memory, secondary storage and/or processing device (during execution of the instructions).

System controller 228 may receive data from sensors included on or within various portions of manufacturing system 200 (e.g., processing chambers 214, 216, 218, transfer chamber 210, load lock 220, etc.). In some embodiments, data received by the system controller 228 may include spectral data and/or non-spectral data for a portion of substrate 202. In other or similar embodiments, data received by the system controller 228 may include data associated with processing substrate 202 at processing chamber 214, 216, 218, as described previously. For purposes of the present description, system controller 228 is described as receiving data from sensors included within processing chambers 214, 216, 218. However, system controller 228 may receive data from any portion of manufacturing system 200 and may use data received from the portion in accordance with embodiments described herein. In an illustrative example, system controller 228 may receive data from one or more sensors for processing chamber 214, 216, 218 before, after, or during a substrate process at the processing chamber 214, 216, 218. Data received from sensors of the various portions of manufacturing system 200 may be stored in a data store 250. Data store 250 may be included as a component within system controller 228 or may be a separate component from system controller 228. In some embodiments, data store 250 may be data store 140 described with respect to FIG. 1.

Manufacturing system 200 may further include a substrate measurement subsystem 240. Substrate measurement subsystem 240 may obtain spectra measurements for one or more portions of a substrate 202 before or after the substrate 202 is processed at manufacturing system 200 using one or more metrology tools discussed herein. In some embodiments, substrate measurement subsystem 240 may obtain spectra measurements for one or more portions of substrate 202 in response to receiving a request for the spectra measurements from system controller 228. Substrate measurement subsystem 240 may be integrated within a portion of manufacturing system 200. In some embodiments, substrate measurement subsystem 240 may be integrated within factory interface 206. In other or similar embodiments, substrate measurement subsystem 240 may not be integrated with any portion of manufacturing system 200 and instead may be a stand-alone component. In such embodiments, a substrate 202 measured at substrate measurement subsystem 240 may be transferred to and from a portion of manufacturing system 200 prior to or after the substrate 202 is processed at manufacturing system 200.

Substrate measurement subsystem 240 may obtain spectra measurements for a portion of substrate 202 by generating spectral data for the portion of substrate 202. In some embodiments, substrate measurement subsystem 240 is configured to generate spectral data, nonspectral data, positional data, and other substrate property data for substrate 202 (e.g., a thickness of substrate 202, a width of substrate 202, etc.). After generating data for substrate 202, substrate measurement subsystem 240 may transmit the generated data to system controller 228. Responsive to receiving data from substrate measurement subsystem 240, system controller 228 may store the data at data store 250.

Figure 3:
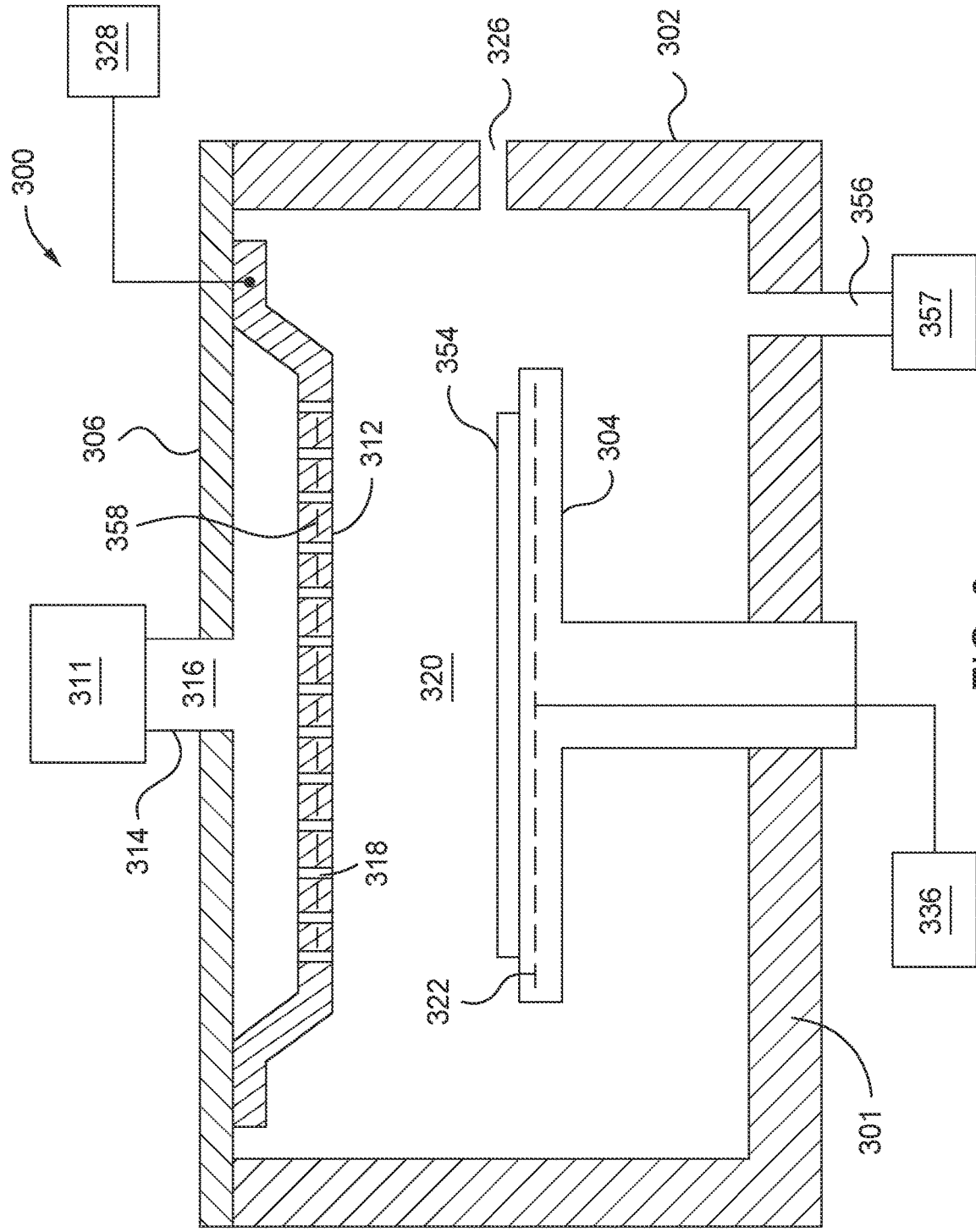
FIG. 3 depicts a schematic cross-sectional view of an exemplary processing chamber.

FIG. 3 depicts a schematic cross-sectional view of an exemplary processing chamber 300. As illustrated, the exemplary processing chamber 300 is configured as a Plasma Enhanced Chemical Vapor Deposition (PECVD) chamber, although in some embodiments, processing chamber 300 may be configured to perform another plasma-enhanced processing operation (such as etching or physical vapor deposition) or a processing operation that does not involve plasma (such as chemical vapor deposition). The processing chamber 300 features a chamber body 302, a substrate support 304 disposed inside the chamber body 302, and a lid 306 coupled to the chamber body 302, and enclosing the substrate support 304 in a processing volume 320. The substrate support 304 is configured to support a substrate 354 thereon during processing. The substrate 354 is provided to the processing volume 320 through an opening 326.

As illustrated, a showerhead 312 contains multiple individually tunable electrodes 358. Showerhead 312 is coupled to a power source 328 through a match circuit. In exemplary embodiments, the power source 328 is a radio frequency (RF) power source that is electrically coupled to an electrode using an RF frequency. Further, the power source 328 provides between about 300 Watts and about 3,000 Watts at a frequency of about 50 KHz to about 13.6 MHz. In some embodiments, the power source 328 can be pulsed during various operations. While not expressly depicted, in some embodiments, electrodes 358 may be coupled to one or more different power sources, other than power source 328. The one or more different power sources may be RF power sources. For example, each of the electrodes 358 may be coupled to a different power source to provide a different power to each of the electrodes 358. The electrodes 358 and corresponding power sources (such as power source 328) facilitate pixelated control of plasma formed within the processing volume 320.

The substrate support 304 contains, or is formed from, one or more metallic or ceramic materials. Exemplary metallic or ceramic materials include one or more metals, metal oxides, metal nitrides, metal oxynitrides, or any combination thereof. For example, the substrate support 304 may contain or be formed from aluminum, aluminum oxide, aluminum nitride, aluminum oxynitride, or any combination thereof.

As illustrated, one or more electrodes 322 are embedded within the substrate support 304, but alternatively may be coupled to a surface of the substrate support 304. The electrodes 322 are coupled to a power source 336. In various embodiments, the power source 336 may be DC power, pulsed DC power, radio frequency (RF) power, pulsed RF power, or any combination thereof. The power source 336 is configured to drive electrodes 322 with a drive signal to generate a plasma within the processing volume 320. It is contemplated that the drive signal may be one of a DC signal and a varying voltage signal (e.g., RF signal). Further, electrodes 322 may alternatively be coupled to the power source 328 instead of the power source 336, and the power source 336 may be omitted. In some embodiments, the power source 328 is configured to drive the showerhead electrodes 358 with drive signal(s) to generate a plasma within the processing volume 320. In one embodiment, the showerhead electrodes 358 are an RF field generator.

Plasma is generated in the processing volume 320 via the power source 328 and the power source 336. An RF field is created by driving at least one of the showerhead electrodes 358 and electrodes 322 with drive signals to facilitate the formation of a plasma within the processing volume 320. The presence of a plasma facilitates processing of the substrate 354, for example, the deposition of a film onto a surface of the substrate 354 or the etching of material from a surface of the substrate 354. In some embodiments, some of the electrodes 322 and/or the showerhead electrodes 358 can be individually controlled to adjust the formation of a plasma within the processing volume 320. That is, certain electrodes can be driven with more power than others, to adjust an amount or composition of plasma generated in a localized section of processing volume 320. This individual control of electrodes, or zones of electrodes, can be used to adjust a uniformity or composition of the generated plasma across the processing volume 320.

An exhaust port 356 is coupled to a vacuum pump 357. The vacuum pump 357 removes excess process gases or by-products from the processing volume 320 via the exhaust port 356 during and/or after processing.

A gas supply source 311 includes one or more gas sources. The gas supply source 311 is configured to deliver the one or more gases from the one or more gas sources through the showerhead 312 and into the processing volume 320. Each of the one or more gas sources provides a process gas such as silane, disilane, tetraethyl orthosilicate (TEOS), germane, a metal halide (such as titanium tetrachloride, tantalum pentachloride, tungsten hexafluoride), an organometallic (such as tetrakis(dimethylamido) titanium, pentakis(dimethylamido) tantalum), ammonia, oxygen ($O_2$), hydrogen peroxide, hydrogen, diborane, chlorine ($Cl_2$), sulfur hexafluoride, a hydrocarbon (generically $C_xH_y$), among others.

In some embodiments, the process gas may be ionized to form a plasma within the processing volume 320. For example, one or more of a carrier gas and an ionizable process gas are provided into the processing volume 320 to process the substrate 354. When processing a substrate, the process gases are introduced to the processing chamber 300 at one or more flow rates via openings 318 of the pixelated showerhead 312. In some examples, a remote plasma source can be used to deliver plasma to the processing chamber 300 and can be coupled to the gas supply source 311.

The showerhead 312 features openings 318 for admitting a process gas or gases into the processing volume 320 from the gas supply source 311. The process gases are supplied to the processing chamber 300 via the gas feed 314, and the process gases enter a plenum 316 prior to flowing through the openings 318. In some embodiments, different process gases that are flowed simultaneously during a processing operation enter the processing chamber 300 via separate gas feeds and separate plenums prior to entering the processing volume 320 through the showerhead 312.

Gas flow through the openings 318 of the showerhead 312 is regulated by one or more micro-electro-mechanical systems (MEMS devices) disposed in the showerhead 312. In some embodiments, gas flow through an individual opening 318 and/or through a cluster of openings 318 (i.e., a zone) may be regulated by a MEMS device. In some embodiments, gas flow through all openings 318 is regulated by a plurality of MEMS devices. In an example, each MEMS device regulates gas flow through one or more openings 318 such that gas flow through any single opening 318 is regulated by a corresponding MEMS device.

The regulation of gas flow by a MEMS device includes permitting a maximum flow of gas through an individual opening 318 and/or through a cluster of openings 318. The regulation of gas flow by a MEMS device includes preventing any flow of gas through an individual opening 318 and/or through a cluster of openings 318. The regulation of gas flow by a MEMS device includes controlling a flow of gas through an individual opening 318 and/or through a cluster of openings 318 such that the flow is greater than zero and less than a maximum flow of gas through the individual opening 318 and/or through the cluster of openings 318.

Figure 4:
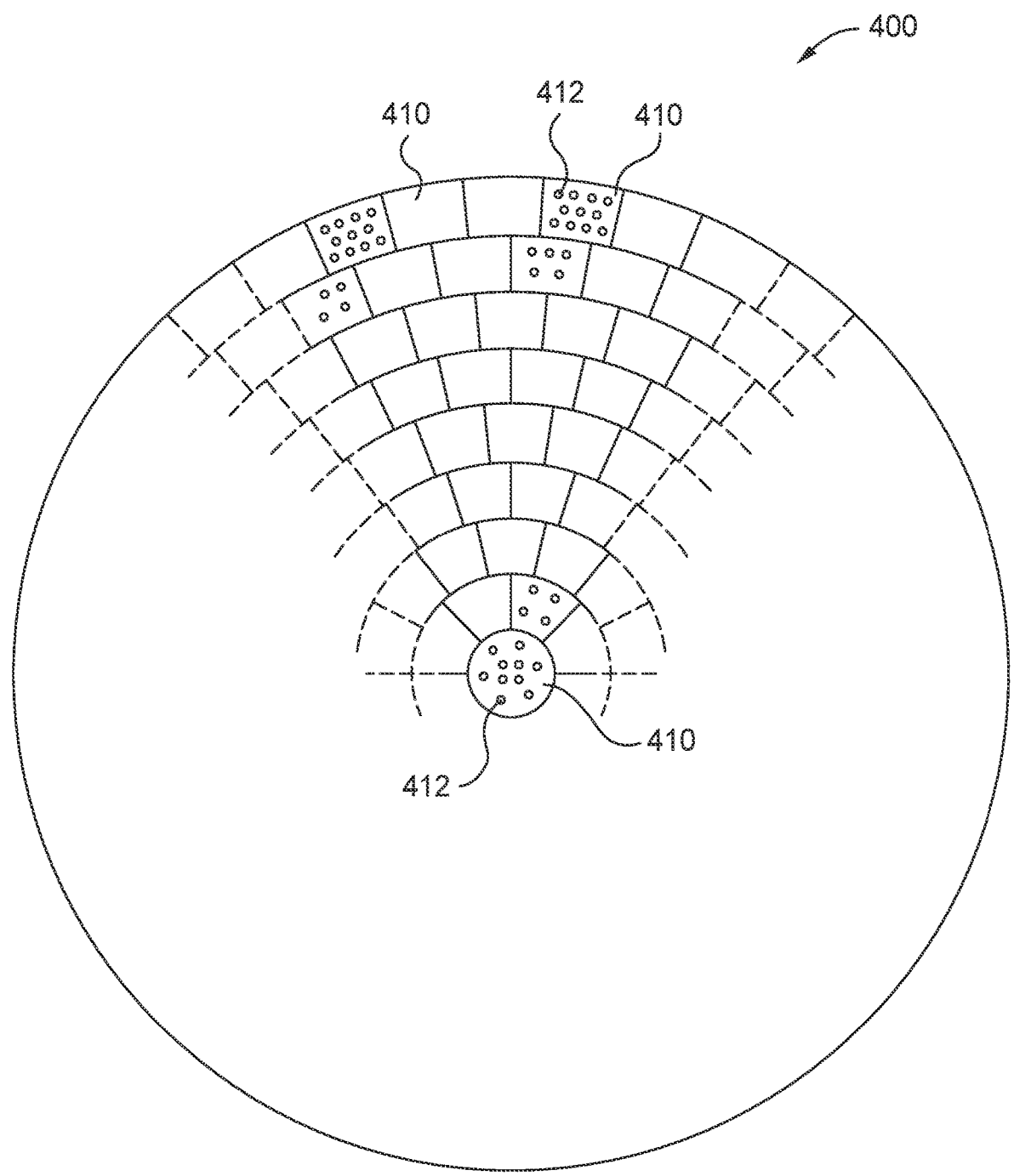
FIG. 4 depicts a schematic plan view of an exemplary faceplate of a showerhead.

FIG. 4 is a schematic plan view of an exemplary faceplate 400 of a showerhead, such as showerhead 312 of processing chamber 300. Zones 410 are delineated on faceplate 400, where each zone 410 includes one or more openings 412 through the faceplate 400. In operation, process gas flow through the one or more openings 412 of a specific zone 410 is controlled by one or more MEMS devices associated with the specific zone 410. In operation, one or more devices, such as MEMS devices and/or heaters, are associated with each zone 410, and are controlled independently and/or in groups, as described herein. In an example, the operation of each MEMS device or heater can be controlled without changing the operating status of another MEMS device or heater associated with faceplate 400. In various embodiments, the number, size, and distribution of zones 410 may be configured according to the type of process to be conducted in processing chamber 300 and/or the specific process gas(es) to be employed.

A controller (such as controller 122 of FIG. 1) may control the gas distribution through one or more openings 412 or zones 410. The controller includes a central processing unit (CPU), a memory containing instructions, and support circuits for the CPU. The controller may be any form of a computer processor that is used in an industrial setting for controlling various chambers and equipment and/or sub-processors therein.

The memory, or non-transitory computer readable medium, is one or more of a readily available memory such as random access memory (RAM), read only memory (ROM), floppy disk, hard disk, flash drive, or any other form of digital storage, local or remote. The support circuits are coupled to the CPU for supporting the CPU (a processor). The support circuits include cache, power supplies, clock circuits, input/output circuitry and subsystems, and the like. Operations and operating parameters are stored in the memory as a software routine that is executed or invoked to turn the controller into a specific purpose controller to control the operations of any part of, or the entire showerhead 312, such as power and gas flow distribution. The controller is configured to conduct any of the operations described herein. The instructions stored on the memory, when executed, cause one or more of the operations described herein to be conducted.

The controller may be designated to control functions of any part of, or of an entirety of, processing chamber 300. As discussed herein, the controller can control operations of a pixelated showerhead by controlling at least a power distributor and/or a gas distributor of the pixelated showerhead. The power distributor controls an amount of power delivered to each power conductor of the pixelated showerhead, e.g., by controlling electrical switches of the showerhead. The gas flow distributor controls gas flow meter settings, as well individual control of gas valves coupled to a gas supply of different gas species. The controller may control any one or more parameters controlled by gas distributor.

In some embodiments, data from any of the sensors discussed herein, and/or any sensor specifically associated with showerhead 312, may be used to provide feedback to the controller. For example, the data may include pressure data and/or temperature data.

The controller uses the data so provided as an input to process commands addressed to individual MEMS device(s) and/or group(s) of MEMS devices. In some of such embodiments, the commands prompt the individual MEMS device(s) and/or group(s) of MEMS devices to adjust a flowrate of a gas through the individual MEMS device(s) and/or group(s) of MEMS devices. In an example, such adjustments provide control of flow distribution of one or more gases through showerhead 312. In some of such embodiments, the commands prompt the individual MEMS device(s) and/or group(s) of MEMS devices to adjust a temperature of a gas flowing through the individual MEMS device(s) and/or group(s) of MEMS devices. In an example, such adjustments provide control of temperature distribution of one or more gases through showerhead 312.

The instructions in the memory of the controller can include one or more machine learning models (such as model(s) 180 of FIG. 1) that can be executed in addition to the operations described herein. As an example, a machine learning algorithm executed by the controller can optimize and alter operational parameters based on one or more sensor measurements taken by the one or more sensors. The operational parameters can include, for example, pressure, temperature, gas flow rate, valve member position, and heater status, among other process parameters.

The one or more machine learning models can account for variations in gas flow rate, gas ratios, temperature, and pressure across the showerhead 312 described herein, among other parameters. In some embodiments, the one or more machine learning algorithms can measure any of the above parameters to determine whether an appropriate quantity of a process gas at an appropriate pressure and an appropriate temperature is being delivered to the appropriate regions of a processing volume according to a prescribed operation. In some embodiments, the one or more machine learning algorithms can prompt the controller to initiate corrective action in order to adjust the quantity, pressure, or temperature of a process gas being delivered to a prescribed region of a processing volume.

The operational flexibilities described above facilitated by showerheads of the present disclosure are not provided by conventional showerheads. Conventional showerheads typically are configured for achieving an optimal distribution of a specific process gas by having a given number of openings of particular sizes arranged in a specific pattern. However, the number, sizing, and arrangement of openings that provides for an optimal distribution of one process gas do not necessarily provide for an optimal distribution of a different process gas. In contrast, showerheads of the present disclosure provide for the relative flow rate of any process gas through an opening, or a cluster of openings, to be tailored to provide for an optimal distribution of any process gas.

The operational flexibilities facilitated by showerheads of the present disclosure provide time and cost efficiencies compared to conventional operations. For example, some conventional processing sequences involve performing a first operation on a substrate with a first process gas in a first processing chamber, then transferring the substrate to a second processing chamber, then performing a second operation on the substrate with a second, different, process gas. In contrast, processing chambers incorporating showerheads of the present disclosure may be used to perform both the first operation with the first process gas and then the second operation with the second process gas. Thus, the need for the second processing chamber is alleviated, as is the time taken to transfer the substrate between the processing chambers.

Furthermore, the operational flexibilities facilitated by showerheads of the present disclosure provide efficiencies in inventory management compared to conventional operations. The use of showerheads of the present disclosure reduces or eliminates the need to stock different showerheads that are configured for use with different process gases for different process operations.

It is contemplated that elements and features of any one disclosed embodiment may be beneficially incorporated in one or more other embodiments. While the foregoing is directed to embodiments of the present disclosure, other and further embodiments of the disclosure may be devised without departing from the basic scope thereof, and the scope thereof is determined by the claims that follow.

Figure 5:
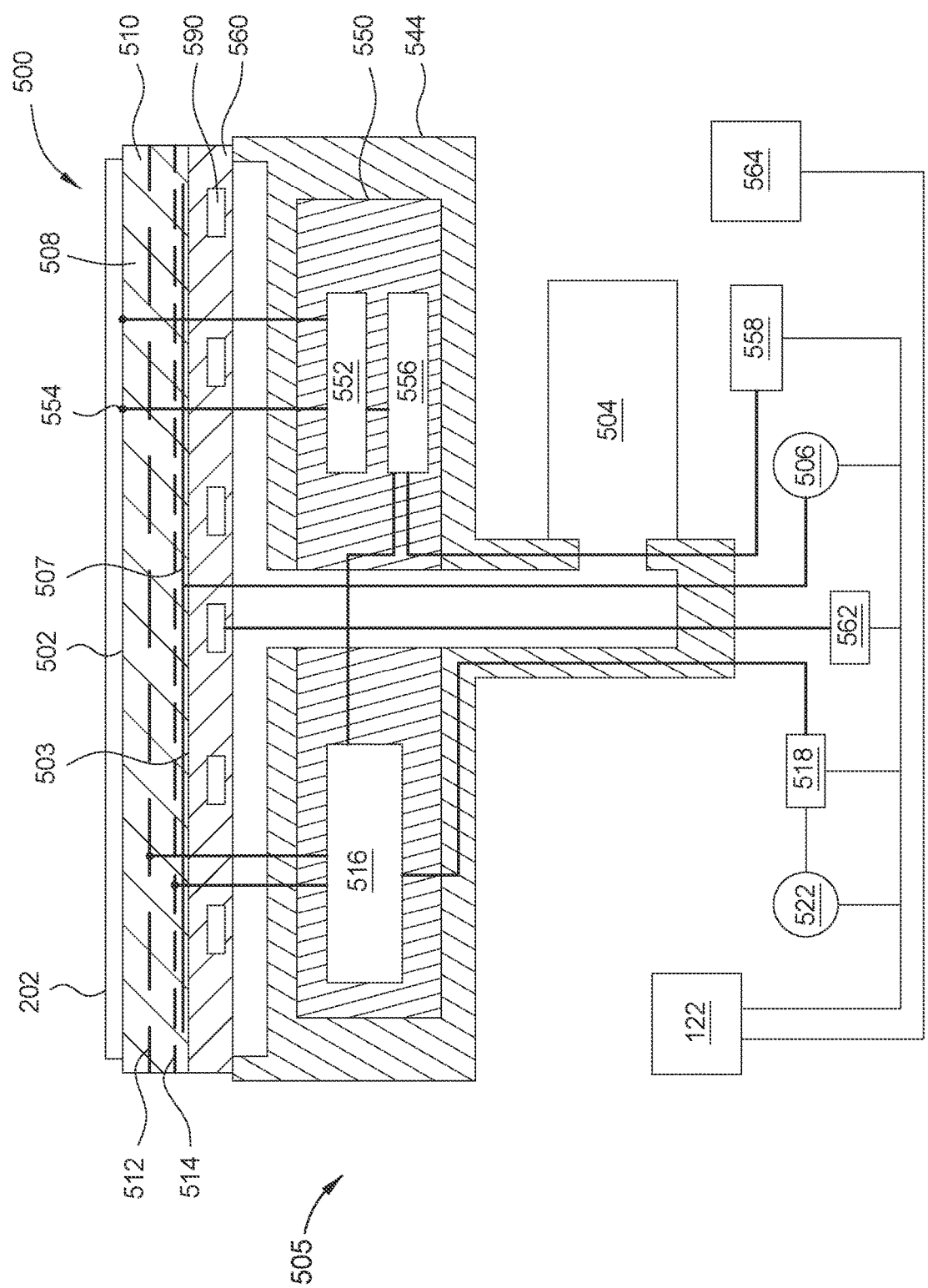
FIG. 5 is a partial cross-sectional schematic side view detailing portions of a substrate support assembly having spatially tunable heaters.

FIG. 5 is a partial cross-sectional schematic side view detailing portions of a substrate support assembly 500 configured to provide azimuthal tuning of a temperature profile across the substrate support assembly. The azimuthal tuning of the temperature profile across the substrate support assembly 500 may be controlled by software routines running on the controller 122. The software routines may also or alternately be stored and/or executed by a second controller (not shown) that is located remotely from the multi-chamber vacuum processing system, such as at the processing chamber 300 or an advance process controller (APC) 564.

The substrate support assembly 500 generally includes at least a substrate support 510. The substrate support 510 may be a vacuum chuck, an electrostatic chuck, a susceptor, or other work-piece support surface. In one embodiment, the substrate support 510 is an electrostatic chuck and will be described hereinafter as the electrostatic chuck 510. The substrate support assembly 500 may also include a cooling base 560. The cooling base 560 may alternately be separate from the substrate support assembly 500. The substrate support assembly 500 may be removably coupled to a support pedestal 505. The support pedestal 505 may include a pedestal base 544. The substrate support assembly 500 may be periodically removed from the support pedestal 505 to allow for refurbishment of one or more components of the substrate support assembly 500.

The electrostatic chuck 510 has a mounting surface 503 and a work-piece support surface 502 opposite the mounting surface 503 where the substrate 202 is removably disposed upon the work-piece support surface 502. The electrostatic chuck 510 generally includes a chucking electrode 507 embedded in a dielectric body 508. Although the chucking electrode 507 is shown proximate the mounting surface 503 of the electrostatic chuck 510, the chucking electrode 507 may be embedded in other portions of the electrostatic chuck 510, such as just under the work-piece support surface 502. The chucking electrode 507 may be configured as a mono polar or bipolar electrode, or other suitable arrangement. The chucking electrode 507 is coupled through an RF filter 504 to a chucking power source 506 which provides a RF or DC power to electrostatically secure the substrate 202 to the work-piece support surface 502 of the electrostatic chuck 510. The RF filter 504 prevents RF power utilized to form a plasma within the processing chamber (such as processing chamber 300 from FIG. 3) from damaging electrical equipment or presenting an electrical hazard outside the chamber.

The dielectric body 508 of the electrostatic chuck 510 may be fabricated from a ceramic material, such as AlN or $Al_2O_3$. Alternately, the dielectric body 508 may be fabricated from a polymer, such as polyimide, polyetheretherketone, polyaryletherketone and the like. Heaters may be embedded within the dielectric body 508. The dielectric body 508 may include one or more main resistive heaters 512 and/or a plurality of spatially tunable heaters 514. The main resistive heaters 512 may be provided to elevate the temperature of the substrate support assembly 500 to a temperature for conducting chamber processes, such as processing the substrate 202 and/or cleaning the interior of the processing chamber 300. The main resistive heater 512 may be configured to provide any one or more laterally separated heating zones, for example, a plurality of concentric ring-shaped zones.

The spatially tunable heaters 514 are complimentary to the main resistive heaters 512 and configured to adjust the localized temperature of the electrostatic chuck 510 in a plurality of discrete locations (or zones) within any one or more of a plurality of laterally separated heating zones defined by the main resistive heaters 512. For example, the spatially tunable heaters 514 may be arranged in a polar array, Cartesian grid of columns and rows, a hexagonal grid, or other suitable matrix. The spatially tunable heaters 514 thus provide localized adjustments to the temperature profile of the substrate 202 placed on the substrate support assembly 500. Thus, the main resistive heaters 512 operate to maintain the temperature profile of the work-piece support surface 502 on a globalized macro scale, while the spatially tunable heaters 514 operate to adjust the temperature at discreet locations of the temperature profile of the work-piece support surface 502 on a localized micro scale.

The main resistive heaters 512 and spatially tunable heaters 514 are coupled through an RF filter 518 to a heater power source 522. The heater power source 522 may provide 900 watts or more power to the heaters 512, 514. The controller 122 (which may be the same as controller 122 of FIG. 1 in some embodiments) may control the operation of the heater power source 522, which is generally set provide power to individual heaters 512, 514 for heating the substrate 202 to a predefined temperature profile. In one embodiment, the main resistive heaters 512 include laterally separated heating zones, wherein the controller 122 enables one zone of the main resistive heaters 512 or even single spatially tunable heaters 514 to be preferentially heated relative to adjacent heaters 512, 514. In some embodiments, each spatially tunable heater 514 may be independently controlled to provide a temperature different than that of another one of the spatially tunable heaters 514. In some embodiments, a plurality, such as at least two and as many as all, of the spatially tunable heaters 514 are independently and simultaneously powered to provide a temperature profiled which is very stable and does not jump in around, which results in a steady and easily controlled temperature profile, which contributes to enhanced uniformity and predictability of substrate processing results.

The electrostatic chuck 510 may include one or more temperature sensors 554. The temperature sensors 554 may measure temperature at a plurality of discrete locations on the work-piece support surface 502. The temperature sensors 554 may provide temperature feedback information to the controller 122 for controlling the power applied by the heater power source 522 to the main resistive heaters 512 and the spatially tunable heaters 514. Additionally, the feedback information may be used to control the operations of the cooling base 560.

The electrostatic chuck 510 may be disposed on the temperature controlled cooling base 560. The temperature controlled cooling base 560 is coupled to a heat transfer fluid source 562. The heat transfer fluid source 562 provides a heat transfer fluid, such as a liquid, gas or combination thereof, which is circulated through one or more conduits 590 disposed in the cooling base 560. The controller 122 may control the fluid flowing through isolated neighboring conduits 590 to enabling local control of the heat transfer between the electrostatic chuck 510 and different regions of the cooling base 560, which assists in controlling the lateral temperature profile of the substrate 202.

The pedestal base 544 is disposed below the cooling base 560 and is configured to accommodate a plurality of driving mechanisms configured to raise and lower a plurality of lifting pins. Additionally, the pedestal base 544 is configured to accommodate the plurality of fluid connections from the electrostatic chuck 510 and the cooling base 560. The pedestal base 544 is also configured to accommodate the plurality of electrical connections from the electrostatic chuck 510. The myriad of connections, for example fluids, electrical, data signals, may run externally or internally of the substrate support assembly 500.

The system controller 122 may include a controller board 550 that may be disposed in the pedestal base 544. Alternately, the controller board 550 may be disposed elsewhere inside or outside the substrate support assembly 500. The controller board 550 may have a pulse width modification (PWM) heater controller 516. The controller board 550 may also have an optical communication interface board 556. The controller board 550 also may optionally have a temperature sensor controller 552.

The temperature sensor controller 552 may be communicatively coupled to the temperature sensors 554 for measuring the substrate 202 temperature. The temperature sensor controller 552 may convert the signals from the temperature sensors 554 to actual temperature readings in discrete locations about the work-piece support surface 502. The controller board 550 also may optionally have a metrology controller (not shown) for determining the thickness of a substrate 202 disposed on the work-piece support surface 502.

The PWM heater controller 516 may connect to the heaters 512, 514. The PWM heater controller 516 may modify the power coming from the heater power source 522 to the individual heaters 512, 514. The PWM heater controller 516 may be programmed and calibrated by measuring the temperature at each spatially tunable heater 514. That is, each spatially tunable heater 514 has its own independent PWM control. The PWM heater controller 516 may control the temperature by adjusting the power parameters for individual spatially tunable heater 514. For example. 100 percent power to one of the spatially tunable heater 514 may result in about 5 degrees Celsius of heat output for increasing the temperature set by the main heater for the surface location above the spatially tunable heater 514. Additionally, 20 percent power to one or more of the spatially tunable heaters 514 may result in about a 1 degree Celsius heat output for increasing the temperature set by the main heater for the surface location above the spatially tunable heater 514. The power may be reduced to 20% for several of the spatially tunable heater 514 and maintained at that level throughout a processing operation. Additionally, the PWM heater controller 516 may operate one or more spatially tunable heaters 514 at a first power level, for example 80 percent, while simultaneously operating one or more separate spatially tunable heaters 514 at a second power level, for example about 20 percent. In one embodiment, the temperature may be regulated with incremental power increases to the spatially tunable heaters 514. For example, a temperature rise may be obtained with a percentage increase, for example 9% increase, in the power supplied to the spatially tunable heater 514 during the course of a process. In another embodiment, the temperature may be regulated by cycling the spatially tunable heater 514 on and off, while the other tunable heaters 514 also cycled on and off, either in-phase, or out of phase. In yet another embodiment, the temperature may be regulated by a combination of adjusting the power levels, cycling and incrementally adjusting the power to the spatially tunable heater 514 as needed to maintain a desired temperature profile.

A temperature map may be obtained by varying the heat output of each individual spatially tuning heater 514 all at one instance. The map may correlate the CD or substrate temperature profile to the power distribution curve for each spatially tunable heater 514. Thus, the spatially tunable heater 514 may be used to generate a temperature profile on the substrate based on a program regulating power settings for the individual spatially tunable heater 514. The logic can be placed directly in the PWM heater controller 516 or in an externally connected controller, such as the controller 122. Thus, the PWM heater controller 516 is configured to independently control an output of one of the plurality of spatially tunable heaters 514 relative to another of the plurality of spatially tunable heaters 514 as well as the main resistive heaters 512.

The optical communication interface board 556 may interface with the PWM heater controller 516. The optical communication interface board 556 may also interface with other controllers such as the temperature sensor controller 552. The optical communication interface board 556 may have an optical connection to an optical converter 558. The optical interface board 556 may send an optical signal to the optical converter 558 for communicating with the controller 122. Thus, communication between the PWM heater controller 516 and the controller 122 may be performed by optical signals which are free of damaging RF energy. For example, the controller 122 may send a signal to control the heat output from one or more of the spatially tunable heaters 514 for adjusting the temperature profile of the substrate 202 disposed on the electrostatic chuck 510. The signal instruction from the controller 122 may enter the optical converter 558 for transmission to the optical communication interface board 556 before delivery of the instruction to the PWM heater controller 516 for controlling the heating profile of the substrate 202 during processing. A benefit of the optical communication interface board 556 is the ability to prevent RF power from traveling through control circuitry leaving the substrate support assembly 500.

The temperature of the surface for the substrate 202 in the processing chamber 300 may be influenced by the evacuation of the process gases by the pump, the slit valve door, the plasma and other factors. The controller 122 may have a temperature profile map for the substrate 202 for obtaining high quality processing results. The controller 122 may receive input from the metrology equipment or other processing equipment to correct for deviation or adverse trends in the process results of the substrate 202. For example, one area of the substrate 202 may etch faster than another area of the substrate 202. The controller 122 may signal the spatially tunable heaters 514 to adjust the surface temperature of the substrate 202 in the area deviating in the etch rate. The controller 122 may activate the spatially tunable heaters 514 in a pattern similar in shape to these areas. The spatially tunable heaters 514 improve the temperature profile of the surface of the substrate 202 produced by the main resistive heaters 512 by reducing variations in the temperature profile to about +/−0.3 degrees Celsius. The temperature profile may be made uniform or to vary precisely in a predetermined manner across regions of the substrate 202 through the use of the spatially tunable heaters 514 to obtain desired results. The use of independently controllable spatially tunable heaters 514 to smooth out or correct the temperature profile generated by the main resistive heaters 512 enable control of the local temperature uniformity across the substrate to very small tolerances, thereby enabling precise process and CD control when processing the substrate 202. Additionally, the small size and high density of the spatially tunable heaters 514 relative to the main resistive heaters 512 enables temperature control at specific locations on the substrate support assembly, substantially without affecting the temperature of neighboring areas, thereby allowing local hot and cool spots to be compensated for without introducing skewing or other temperature asymmetries.

It is contemplated that there may be about 200 to about 400, or even more spatially tunable heaters 514 in a given embodiment of a substrate support assembly 500 configured for use with a 300 mm substrate. Even more spatially tunable heaters 514 are contemplated for substrates of 450 mm or larger. Exemplary distribution of the spatially tunable heaters 514 are described further below with reference to FIGS. 6A-6D.

Figure 6A:
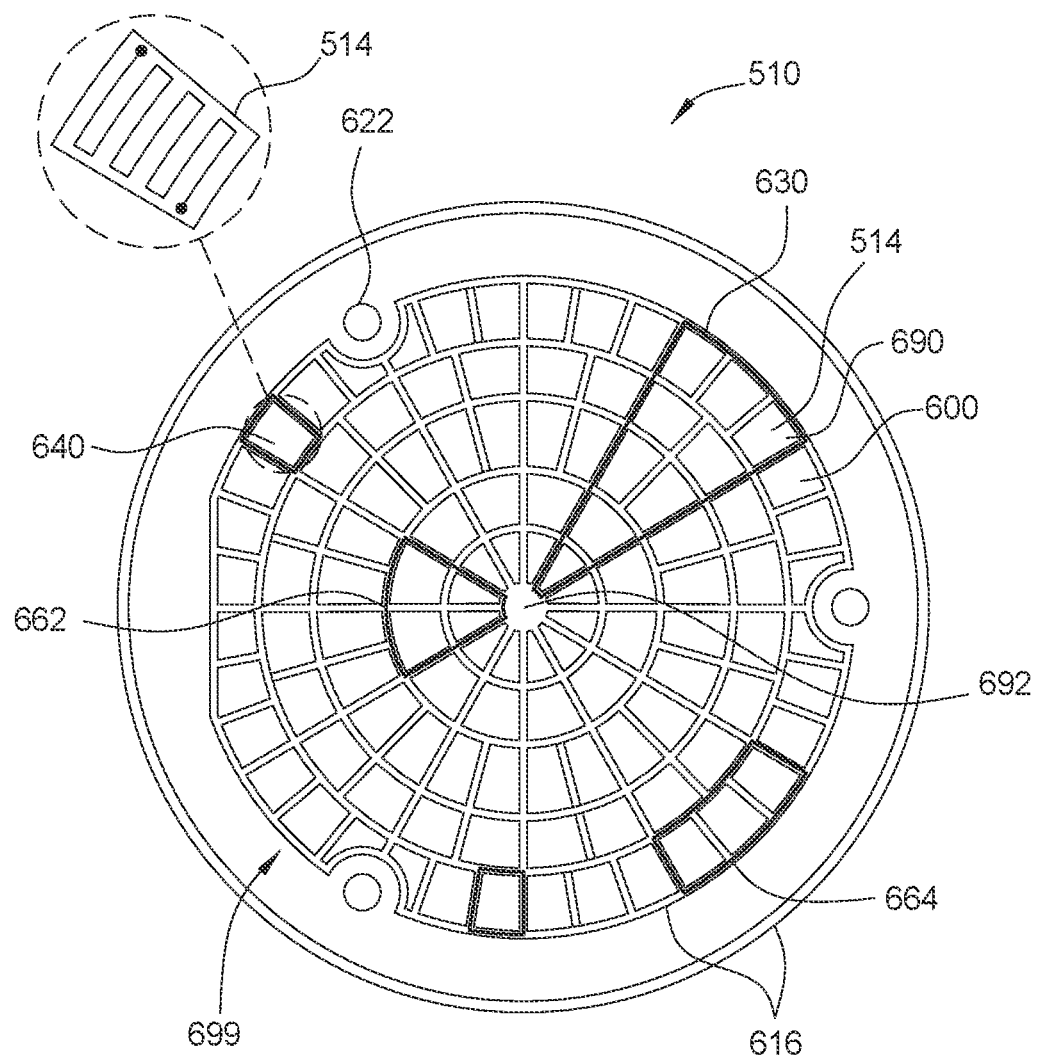
FIGS. 6A-6D are top views of the substrate support assembly illustrating example layouts for the spatially tunable heaters.
Figure 6B:
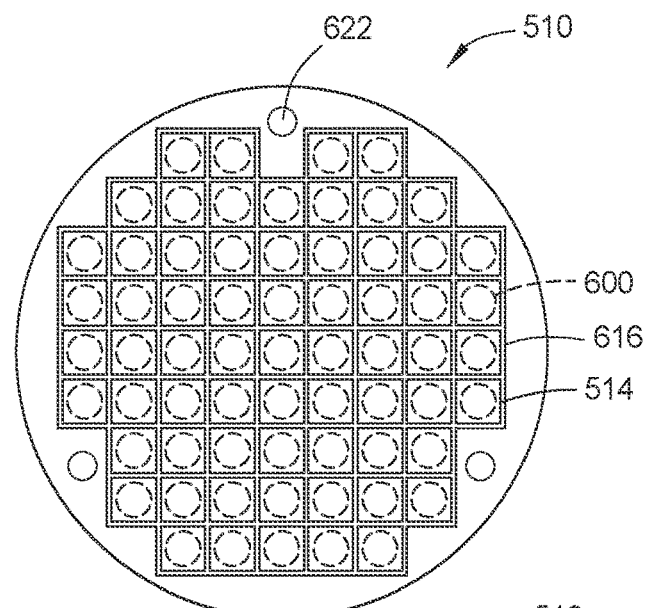
Figure 6C:
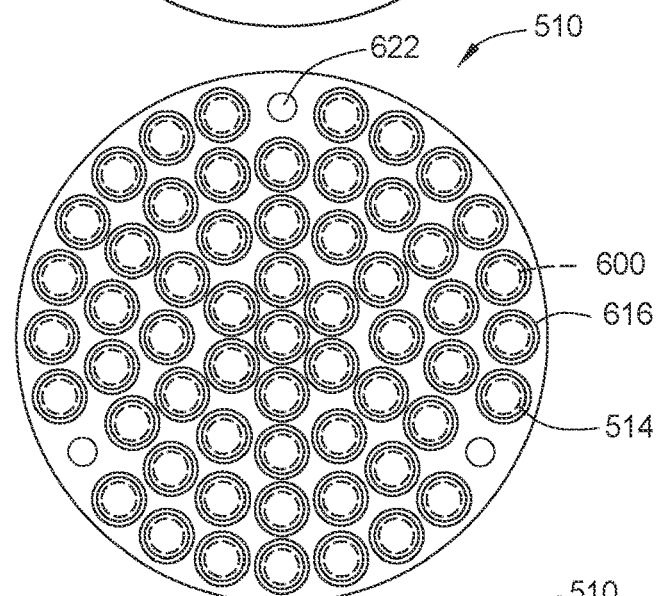
Figure 6D:
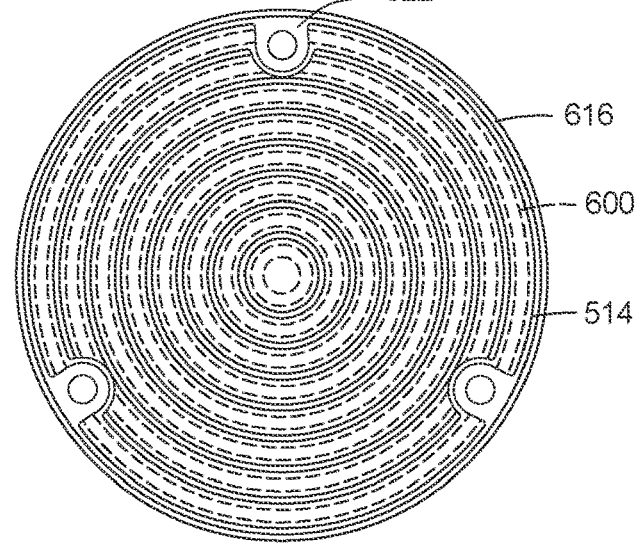

FIGS. 6A-6D are top views of the electrostatic chuck 510 illustrating example layouts of cells 690 having the spatially tunable heaters 514 therein. FIG. 6A is a top view of the electrostatic chuck 510 of FIG. 5, according to one embodiment. FIGS. 6B-6D are top views of the electrostatic chuck 510 of FIG. 5, according to alternate embodiments. The cells 690 may have material (or gaps) which act as a thermal choke 616 between adjacent cells 690. The thermal chokes 616 separate and reduce conduction between adjacent cells 600. Thus, by individually and independently controlling the power provided to each spatially tunable heaters 514 in each cell 690, a localized approach is achieved for controlling the temperature which enables specific points of the substrate 202 to be heated or cooled, thereby enabling a truly addressable lateral temperature profile tuning and control of the surface of the substrate 202.

Referring now to FIG. 6A, the thermal choke 616 is disposed between each neighboring cell 690. Each cell 690 has associated therewith at least one of the spatially tunable heaters 514. The number of cells 690 shown is for illustration only, and any number of embodiments may have substantially more (or less) cells 690. The number of spatially tunable heaters 514 may be at least an order of magnitude greater than the number of main resistive heaters 512. The number of spatially tunable heaters 514 located across the substrate support assembly 500 may easily be in excess of several hundred.

The spatially tunable heaters 514 may be configured in a pattern 699 to efficiently generate a heat profile along the surface of the electrostatic chuck 510. The pattern 699 may be symmetric about a midpoint 692, while providing clearance in and around holes 622 for lift pins or other mechanical, fluid or electrical connections. Each spatially tunable heater 514 may be controlled by the controller 122 through the PWM controller 516 (FIG. 5). The PWM controller 516 may turn on a single spatially tunable heater 514 defining a local area 640; or a plurality of spatially tunable heaters 514 grouped to define an inner wedge 662, a perimeter group 664, a pie shaped area 630, or other desired geometric configuration, including non-contiguous configurations for determining a desired temperature profile. In this manner, temperature can be precisely controlled at independent locations along the surface of the electrostatic chuck 510, such independent locations not limited to concentric rings, or other center to edge configurations known in the art. Although the pattern 699 shown is comprised of discontinuous smaller units, the pattern 699 may alternatively have larger and/or smaller units, extend to the edge, or have other forms. In the embodiment depicted in FIG. 6A, the pattern 699 of spatially tunable heaters 514 are arranged in a polar array about the midpoint 692, which in some embodiments, may coincide with the centerline of the electrostatic chuck 510.

FIG. 6B is a top view of the electrostatic chuck 510 depicted in FIG. 5, according to another embodiment. The spatially tunable heaters 514 are arranged in the form of a grid, thus defining an array of temperature control cells 690 also arranged in the grid pattern. Although the grid pattern of spatially tunable heaters 514 is shown as an X/Y (Cartesian) grid comprised of rows and columns, the grid pattern of spatially tunable heaters 514 may alternatively have some other uniformly packed form, such as a hexagon close pack. It should be appreciated, as discussed supra, the spatially tunable heaters 514 may be activated in groups or singularly.

FIG. 6C is a top view of the electrostatic chuck 510 depicted in FIG. 5, according to another embodiment. FIG. 6C illustrates a plurality of spatially tunable heaters 514 arranged in a polar array. Optionally, one or more of thermal chokes 616 may be disposed between the spatially tunable heaters 514. The polar array pattern of the spatially tunable heaters 514 defines the neighboring cells 690, which are thus also be arranged in a polar array. Optionally, thermal chokes 616 may be utilized to isolate each cell 690 from the adjacent cell 690.

FIG. 6D is a top view of the electrostatic chuck 510 depicted in FIG. 5, according to another embodiment. FIG. 6D illustrates a plurality of spatially tunable heaters 514 arranged in concentric channels. The concentric channel pattern of the spatially tunable heaters 514 may be optionally separated by thermal chokes 616. It is contemplated that the spatially tunable heaters 514 and cells 690 may be arranged in other orientations.

The number and density of the spatially tunable heaters 514 contribute to the ability for controlling the temperature uniformity across the substrate to very small tolerances which enables precise process and CD control when processing the substrate 202. Additionally, individual control for one of the spatially tunable heaters 514 relative to another spatially tunable heater 514 enables temperature control at discrete locations along the surface of the substrate support assembly 500 without substantially affecting the temperature of neighboring or adjacent areas of the surface. This feature allows local hot and cool spots to be compensated for without introducing skewing or other temperature asymmetries. The spatially tunable heaters 514 may have an individual temperature range between about 0.0 degrees Celsius and about 10.0 degrees Celsius with the ability to control the temperature rise in increments of about 0.1 degrees Celsius. In one embodiment, the plurality of spatially tunable heaters 514 in the substrate support assembly 500 in conjunction with the main resistive heaters 512 have demonstrated the ability to control the temperature uniformity of a substrate 202 processed thereon to less than about ±0.3 degrees Celsius. Thus, the spatially tunable heaters 514 allow both lateral and azimuthal tuning of the lateral temperature profile of the substrate 202 processed on the substrate support assembly 500.

The heaters 514, 512 may be controlled by a software routine. The software may incorporate current substrate CD measurements and process results along with the process recipes and other parameters to tune the temperature profile for the substrate 202 undergoing processing in the processing chamber 300.

Figure 7:
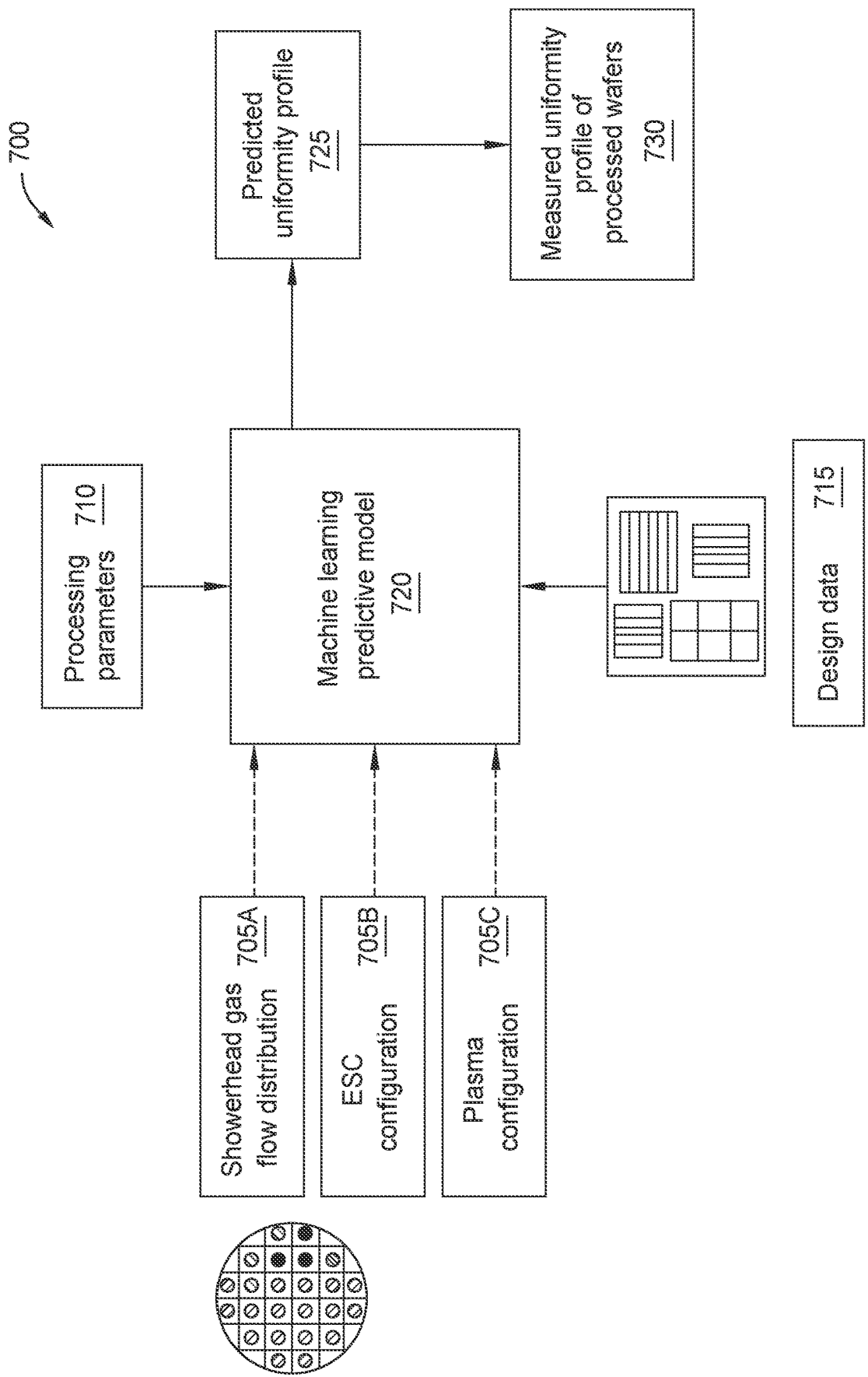
FIG. 7 depicts exemplary architecture for training a machine learning model for use in a processing chamber.

FIG. 7 depicts exemplary architecture components 700 for training one or more machine learning models to be used in conjunction with processing chamber 300 of FIG. 3. As depicted, a machine learning predictive model 720 is trained with multiple inputs.

Processing parameters 710 may comprise any parameter necessary for the particular process occurring in the processing chamber. For example, for an etching or deposition process, the parameters may comprise an electrostatic chuck temperature, time of processing, type of gas, flow rate of gas, temperature, pressure, RF bias, etc. for the processing chamber.

Design data 715 comprises information such as mask layout of the chip and the components that are to be built upon a semiconductor wafer during the manufacturing process occurring in the processing chamber. For example, design data 715 may include information regarding the components and where they are to be located on the processed wafer.

In various embodiments, one or more machine learning predictive model 720 can be trained for each one or more manufacturing components. For example, one or more machine learning predictive models 720 can be trained for optimizing gas flow distribution through one or more zones of a pixelated showerhead. One or more machine learning predictive models 720 can be trained for optimizing heating applied from one or more spatially tunable heaters of an electrostatic chuck. One or more machine learning predictive models 720 can be trained for optimizing an amount of RF bias generated from one or more electrodes, to adjust plasma generation. Additionally, one or more machine learning predictive models 720 can be trained for optimizing any combination of the above.

Showerhead gas flow distribution 705A information contains information regarding which process gases are to be released from which individual openings, or zones of openings, from a pixelated showerhead (such as showerhead 312 of FIG. 3), for a particular manufacturing process. The showerhead gas flow distribution 705A information may also contain information such as composition of gas, flow rate, pressure, temperature, or any other related process parameter, for each opening or zone of openings. In various embodiments, the showerhead gas flow distribution 705A is a tunable parameter, in that one or more components of the showerhead gas flow distribution 705 can be varied during a manufacturing process. That is, a gas flow rate through a particular opening or zone of openings can be varied during a manufacturing process.

Upon processing the showerhead gas flow distribution 705 information, design data 715 information, and the processing parameters 710 information, the machine learning predictive model 720 generates a predicted uniformity profile 725 for the pixelated showerhead process. This predicted uniformity profile 725 can then be compared with measured uniformity profiles of processed wafers 730. In this way, the machine learning predictive model 720 for the pixelated showerhead process can be trained until predicted uniformity profile 725 matches measured uniformity profile of processed wafers 730 for the training data set, within a predetermined tolerance limit.

ESC configuration 705B contains information regarding configuration for one or more of the main resistive heaters of an electrostatic chuck (such as electrostatic chuck 510 of FIG. 5), and/or the spatially tunable heaters for the electrostatic chuck. By adjusting one or more of the heaters for the electrostatic chuck, the temperature profile across the chuck can be adjusted and localized.

Upon processing the ESC configuration 705B information, design data 715 information, and the processing parameters 710 information, the machine learning predictive model 720 generates a predicted uniformity profile 725 for the electrostatic chuck. This predicted uniformity profile 725 can then be compared with measured uniformity profiles of processed wafers 730. In this way, the machine learning predictive model 720 for the electrostatic chuck can be trained until predicted uniformity profile 725 matches measured uniformity profile of processed wafers 730 for the training data set, within a predetermined tolerance limit.

Plasma configuration 705C contains information regarding process gases, temperatures, flow rates, gas ratios, pressure, power profile information, and other parameters for the generation of plasma in the processing volume. By adjusting one or more of the process parameters for the generation of plasma, the amount and composition of the plasma can be adjusted and localized.

In some embodiments, upon processing the plasma configuration 705C information, design data 715 information, and the processing parameters 710 information, the machine learning predictive model 720 generates a predicted uniformity profile 725 for plasma generation in the processing chamber. This predicted uniformity profile 725 can then be compared with measured uniformity profiles from processed wafers 730. In this way, the machine learning predictive model 720 for the plasma can be trained until predicted uniformity profile 725 matches measured uniformity profile of processed wafers 730 for the training data set, within a predetermined tolerance limit.

While the term "uniformity profile" is used herein for simplicity, the predicted uniformity profile and measured uniformity profiles can vary depending on the particular process being performed in the processing chamber. That is, for an etch process, the "uniformity profile" may actually be an etch rate, etch rate uniformity, critical dimension, critical dimension uniformity, edge to edge placement error, etc. For other processes, the "uniformity profile" may actually be film property data, dopant concentration, density, defects, deposition layer thickness, or deposition layer uniformity.

Figure 8:
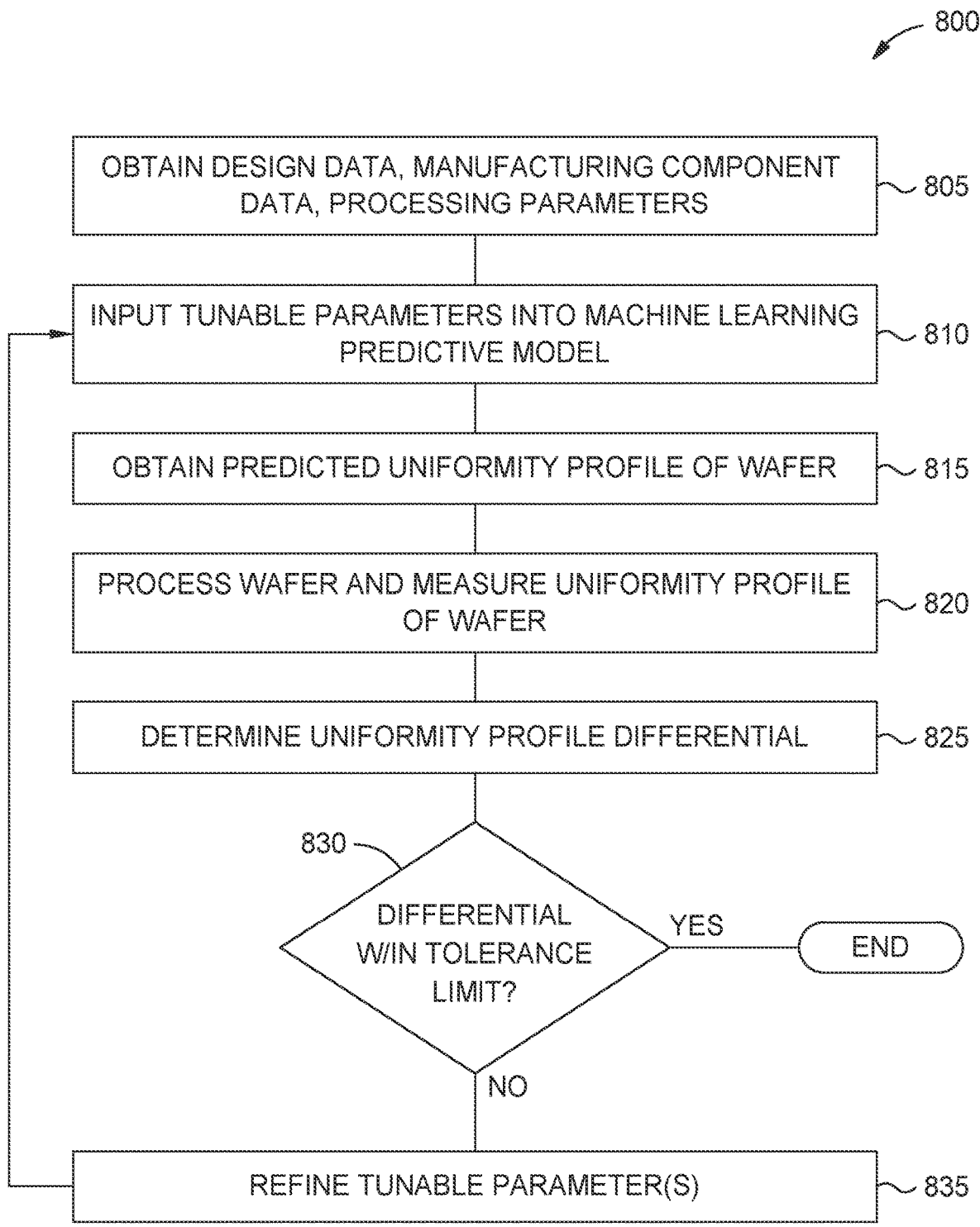
FIG. 8 depicts an exemplary process for training a machine learning predictive model.

FIG. 8 depicts an exemplary process 800 for training a machine learning predictive model, such as machine learning predictive model 720 of FIG. 7, which may be a model(s) 180 of predictive system 110 of FIG. 1. The process 800 may be performed by training engine 172 of FIG. 1. In exemplary embodiments, the process 800 may be used to train a machine learning predictive model for a manufacturing component, such as a pixelated showerhead (such as showerhead 312 of FIG. 3), electrostatic chuck (such as electrostatic chuck 510 of FIG. 5), or generation of plasma (as discussed above with respect to FIG. 3). Alternatively, process 800 may be used to train a machine learning predictive model for any combination of the manufacturing components.

At block 805, the machine learning predictive model obtains design data (such as design data 715 of FIG. 7), manufacturing component data (such as showerhead gas flow distribution 705A of FIG. 7, ESC configuration 705B and plasma configuration 705C), and processing parameters (such as processing parameters 710 of FIG. 7). In exemplary embodiments, for each particular manufacturing process, the design data 715 is static, while processing parameters 710 and manufacturing component data 705A-705C can be dynamic and considered as tunable knobs (also sometimes referred to herein as tunable parameters).

At block 810, the tunable parameters (e.g., processing parameters and manufacturing component data) are input into a machine learning predictive model. At block 815, the machine learning predictive model processes the inputs and generates a predicted uniformity profile of a wafer. At block 820 the uniformity profile of a processed wafer is measured using one or more metrology methods as discussed herein. At block 825, a differential is determined between the predicted uniformity profile from block 815 and the measured uniformity profile of block 820.

It is determined at block 830 if the differential in the uniformity profiles is within a tolerance limit. If so, then the training process for the particular training data set of the machine learning predictive model can end. If the differential in the uniformity profiles is not within a tolerance limit, then one or more tunable parameters are refined and input into the machine learning predictive model again at block 810 and the process continues iteratively until the model is trained to predict profiles that match with measured data within a predetermined tolerance limit.

Figure 9:
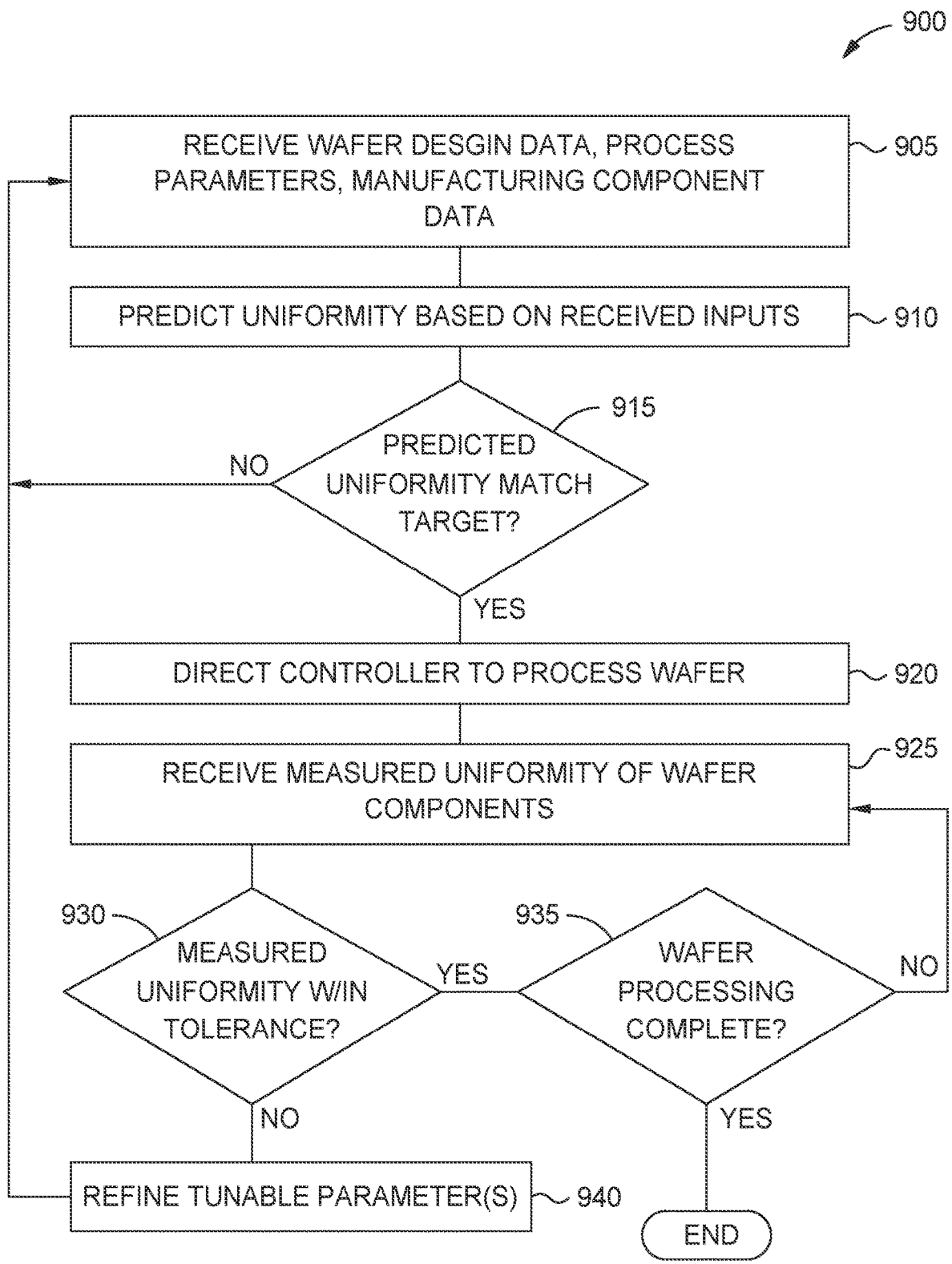
FIG. 9 depicts an exemplary model prediction method for a trained machine learning predictive model.

FIG. 9 depicts an exemplary model prediction method flow 900 for a trained machine learning predictive model. The exemplary method may be performed by an inferencing system of the machine learning prediction model. In various embodiments, the inferencing system may execute the method via a processor within the controller (such as controller 122 of FIG. 1), or on a server in communication with the controller. While the operations are depicted in one particular order in exemplary FIG. 9, it is to be understood that they may be performed in a different order in other embodiments. Further, there may be additional operations in method flow 900 that are not depicted for simplicity.

At block 905, the inferencing system receives an input of wafer design data (such as design data 715 of FIG. 7), one or more process parameters (such as processing parameters 710 of FIG. 7), and/or manufacturing component data (such as 705A-705C of FIG. 7). As discussed herein, design data can include information regarding the specific structures to be built upon the wafer and the layout of the structures on the wafer. The wafer design data can be input into the inferencing system by a human administrator, or received electronically from a database or other electronic data storage medium.

The process parameters received at block 905 (such as process parameters 710 of FIG. 7) may be for the particular process that is to be performed in the processing chamber. The process parameters can be input into the inferencing system by a human administrator, or received electronically from an electronic data storage medium.

The received manufacturing component data at block 905 is for the particular process that is to be performed in the processing chamber. As discussed herein, there may be a customized showerhead gas flow configuration depending on the manufacturing process and/or wafer design data, for a manufacturing process using a pixelated showerhead. In addition, there may be a customized desired temperature profile across an electrostatic chuck for a manufacturing process and/or wafer design. Further, there may be a customized desired amount or composition of plasma generated for a specific manufacturing process and/or wafer design. The manufacturing component data can be received by the inferencing system from a human administrator, or electronically from an electronic data storage medium.

At block 910, the inferencing system predicts a wafer uniformity based on the received inputs from block 905 for the particular process. If the predicted uniformity matches a target uniformity in block 915, then the inferencing system directs a controller for the processing chamber to begin processing a wafer in block 920. If the predicted uniformity does not match a target uniformity in block 915, then one or more of the received process parameters or the manufacturing component data from block 905 are updated and a new prediction is generated in block 910.

At block 920, the inferencing system directs a controller to begin processing a wafer, and one or more metrology tools as discussed herein are utilized in block 925 to measure performance of the processing of the wafer. At block 925, the inferencing system receives measurement(s) regarding uniformity of wafer components. These measurements may be received by real-time monitoring tools, or after wafer processing is complete via one or more onboard, in line, in situ, or virtual metrology tools. The particular measurements may vary based on the particular process being conducted in the processing chamber. For example, for a deposition process, a deposition layer thickness or deposition layer uniformity can be determined.

At block 930, the inferencing system determines whether the measured uniformity of wafer components from block 925 is within desired tolerance limits. If not, then the inferencing system refines one or more tunable parameters in block 940 and returns to input the refined parameters into the machine learning predictive model. The refined tunable parameters can be one or more of the process parameters or manufacturing component data. In this way, the machine learning predictive model can be further trained or updated with actual process results to produce a more robust model for a next iteration of wafer processing.

If the measured uniformity of wafer components is within tolerance limits at block 930, then the system determines whether the wafer processing is complete at block 935. That is, if real-time monitoring tools are utilized, then blocks 925, 930, and 935 continue to operate iteratively until wafer processing is complete. That is, the inferencing system returns to block 925 to receive additional measurements regarding uniformity of wafer components. In the case of real-time measurements, the method continues iteratively in substantially real-time until the process completes for either a single wafer or a batch of wafers. Once the inferencing system determines at block 935 that wafer processing is complete, then the method ends.

Figure 10:
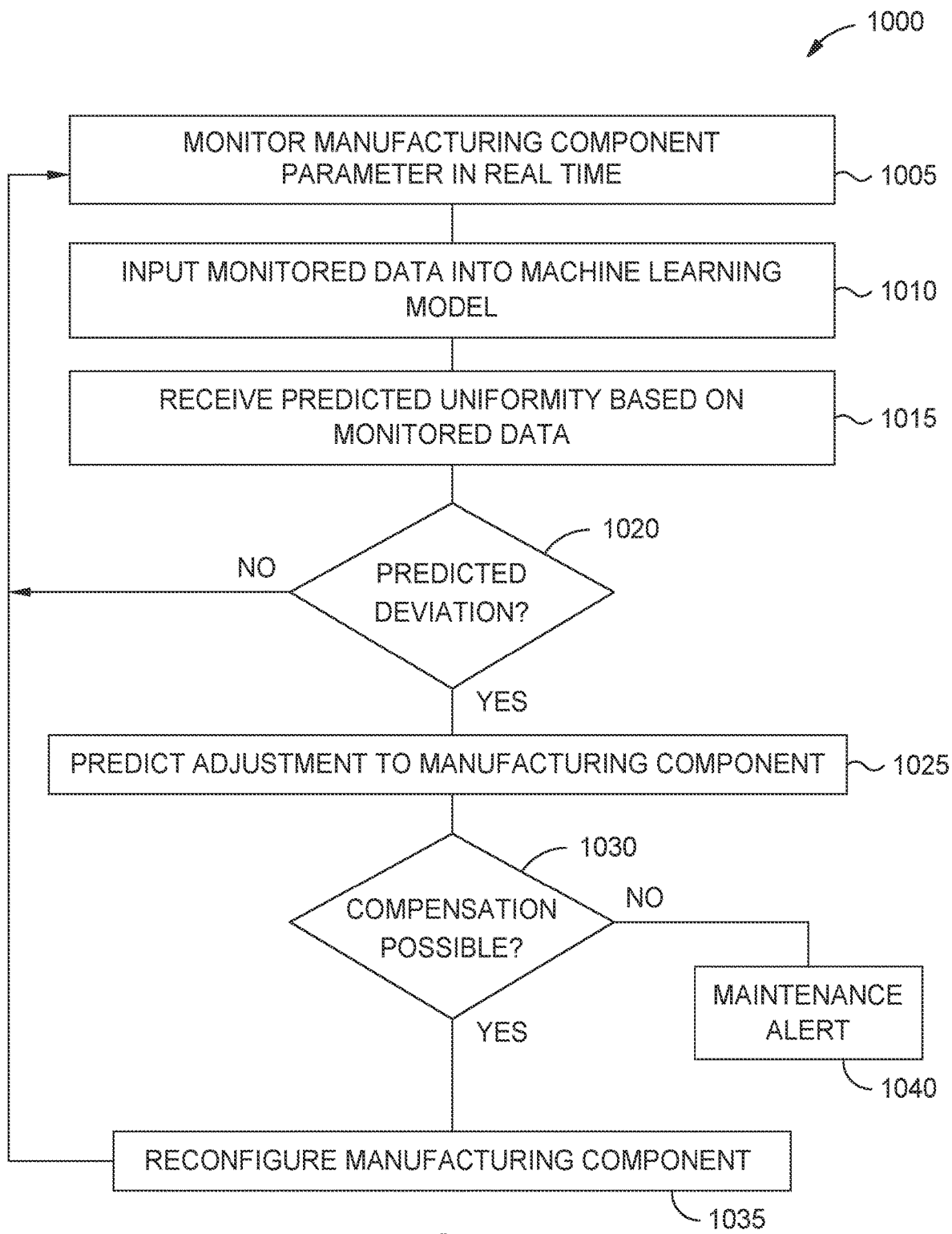
FIG. 10 depicts an exemplary process flow for real-time modification of a manufacturing component.

FIG. 10 depicts an exemplary process flow for real-time modification of one or more manufacturing component parameters during wafer processing using the machine learning predictive model as described herein. In some embodiments, the process can modify in substantially real-time the gas flow through a showerhead (such as showerhead 312 of FIG. 3), heat generated by one or more heaters to create a particular temperature profile across an electrostatic chuck (such as electrostatic chuck 510 of FIG. 5), and/or an amount of RF bias generated from an electrode (such as electrode 358 of FIG. 3) for plasma generation. The process flow may be conducted by a controller of the particular manufacturing component, or a controller of the manufacturing equipment as a whole.

At block 1005, the controller monitors one or more manufacturing component parameters in substantially real-time. The manufacturing component parameters may include, for example, configuration, power, flow rate, pressure, temperature, etc. Any of the real-time metrology tools discussed herein, along with any of the sensors discussed herein can be used for monitoring the manufacturing component parameters during a process. At block 1010, the controller causes the monitored data to be input into a machine learning predictive model, which may be one of the models stored at the predictive server 112. The machine learning predictive model generates a predicted uniformity profile based on the received inputs. The controller receives, at block 1015, the predicted uniformity profile.

At block 1020, the controller determines if the predicted uniformity profile is predicting a deviation from a target uniformity profile and/or a previously generated prediction. If not, then the controller returns to monitoring the manufacturing component parameter. If there is a predicted deviation, then the controller recalls the machine learning prediction model to predict an adjustment to the monitored manufacturing component parameter, or a different parameter, to correct for the deviation. In one example, the adjustment may be a change in flow rate of gas flowing through a particular opening or zone of openings for a pixelated showerhead. In another example, the adjustment may be a change in an amount of heat generated from a particular heater for an electrostatic chuck. In a further example, the adjustment may be a change in an amount of RF bias generated At block 1030, the controller determines whether the predicted adjustment can still be made to the current process. That is, if the process is almost complete, the controller may determine that any change made to the manufacturing component parameter will not correct for the deviation on the current wafer under processing. If the process has just begun, then there may be time for adjustments. If compensation is possible, then the controller reconfigures one or more operations of the manufacturing component at block 1035 and returns to monitoring the manufacturing component parameter at block 1005. If compensation is not possible, then the controller may trigger a maintenance alert at block 1040, to alert that the manufacturing component is potentially malfunctioning.

In various implementations, the maintenance alert at block 1040 may trigger a shutdown procedure for the current wafer under processing, or trigger a shutdown procedure upon completion of the processing of the current wafer. The maintenance alert may signal to an operator of the manufacturing system that there is a potential malfunction with the manufacturing equipment so that the operator can determine the defective component and an appropriate remedy.

Figure 11:
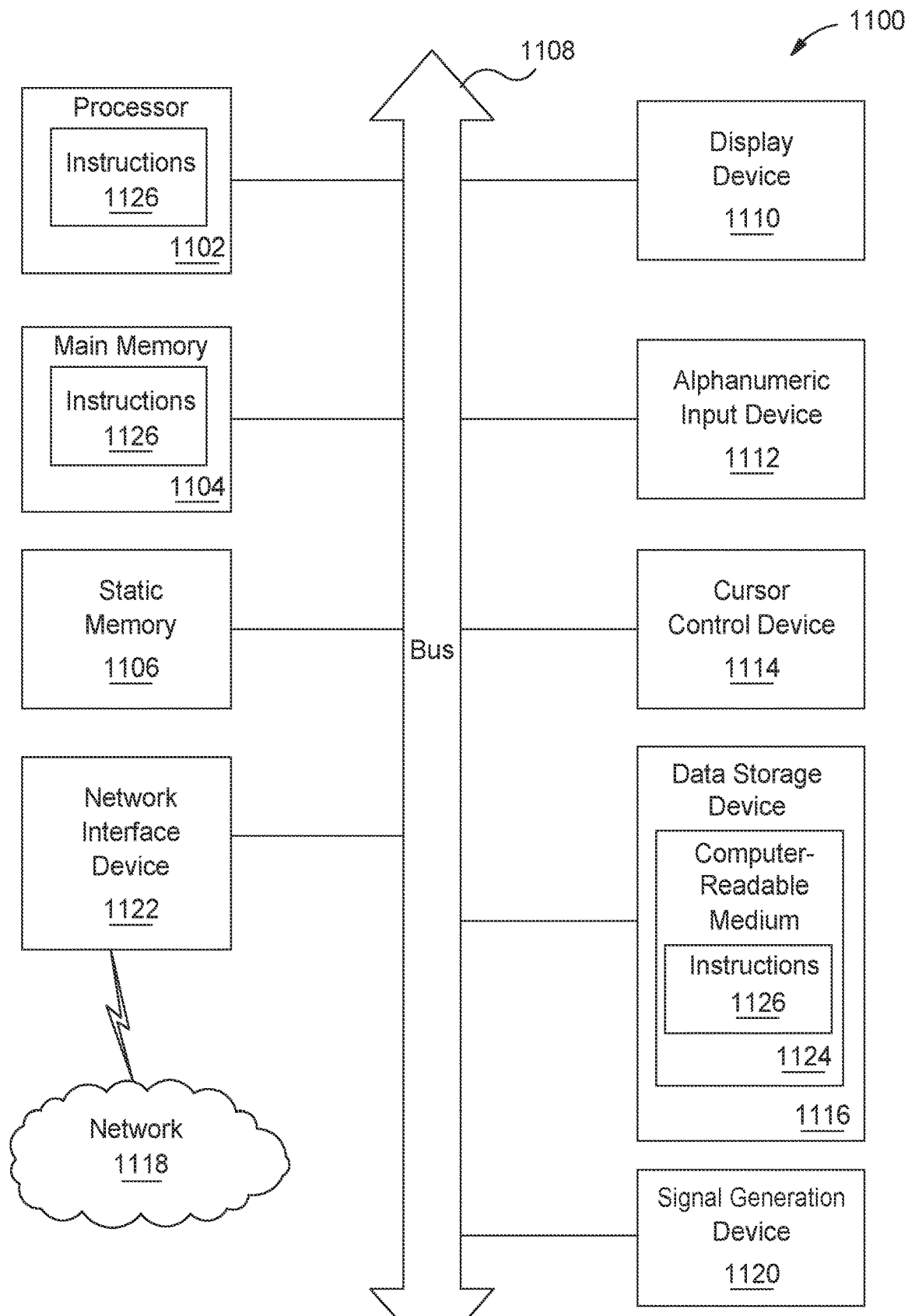
FIG. 11 depicts an example machine of a computer system.

FIG. 11 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) etc.), a static memory 1106 (e.g., flash memory, static random access memory (SRAM), etc.), and a data storage device 1116, which communicate with each other via a bus 1108.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions for performing the operations and steps discussed herein.

The computer system 1100 may further include a network interface device 1122 to communicate over a network 1118. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse or a touch pad),), a signal generation device 1120 (e.g., a speaker), a graphics processing unit (not shown), video processing unit (not shown), and audio processing unit (not shown).

The data storage device 1116 may include a machine-readable storage medium 1124 (also known as a computer-readable medium) on which is stored one or more sets of instructions or software embodying any one or more of the methodologies or functions described herein. The instructions may also reside, completely or at least partially, within the main memory 1104 and/or within the processing device 1102 during execution thereof by the computer system 1100, the main memory 1104 and the processing device 1102 also constituting machine-readable storage media.

While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

While the foregoing is directed to embodiments of the present disclosure, other and further embodiments of the disclosure may be devised without departing from the basic scope thereof, and the scope thereof is determined by the claims that follow.

What is claimed is:

1. A processor-implemented method for processing a semiconductor wafer using a trained machine learning predictive model, the method comprising:
    inputting, into a trained machine learning predictive model, at least one of: a semiconductor wafer design data or process parameters;
    inputting, into the trained machine learning predictive model, a gas flow configuration for a pixelated showerhead;
    receiving a generated predicted uniformity profile from the trained machine learning predictive model;
    determining that the generated predicted uniformity profile matches a target uniformity profile;
    directing a controller to process the semiconductor wafer;
    receiving a measured uniformity of components on the processed semiconductor wafer;
    determining whether the measured uniformity is within a tolerance limit; and
    upon determination that the measured uniformity profile is within the tolerance limit, determining that processing of the semiconductor wafer has completed.

2. The method of claim 1, wherein the process parameters include one or more of: an electrostatic chuck temperature, time of processing, type of gas, power, RF bias, pressure, or temperature in a processing chamber for the semiconductor wafer.

3. The method of claim 1, wherein the gas flow configuration for the pixelated showerhead comprises a distribution of gas flow in one or more zones of the pixelated showerhead.

4. The method of claim 1, wherein the measured uniformity profile is a measured deposition layer thickness on the processed semiconductor wafer.

5. The method of claim 1, wherein the measured uniformity profile is a measured critical dimension uniformity on the processed semiconductor wafer.

6. The method of claim 1, wherein the measured uniformity profile is received from one or more metrology tools.

7. The method of claim 1, further comprising: upon determination that the measured uniformity profile is outside of the tolerance limit, refining at least one of the semiconductor wafer design data, the process parameters, or the gas flow configuration for the pixelated showerhead.

8. The method of claim 1, further comprising: upon determination that the measured uniformity profile is outside of the tolerance limit:
    predicting, using the trained machine learning predictive model, an adjustment to a flow rate of at least one process gas from the pixelated showerhead;
    determining, using the trained machine learning predictive model, whether the predicted adjustment to the flow rate of the at least one process gas is feasible; and
    reconfiguring the flow rate of the at least one process gas from the pixelated showerhead, upon determination that the predicted adjustment is feasible.

9. The method of claim 8, wherein the reconfiguring the flow rate of the at least one process gas from the pixelated showerhead comprises reconfiguring the flow rate of the at least one process gas from at least one zone of the pixelated showerhead.

10. The method of claim 8, further comprising:
    generating a maintenance alert upon determination that the predicted adjustment is not feasible.

11. A processor-implemented method for processing a semiconductor wafer using a trained machine learning predictive model, the method comprising:
    inputting, into a trained machine learning predictive model, at least one of: a semiconductor wafer design data or process parameters;
    inputting, into the trained machine learning predictive model, a configuration for an electrostatic chuck;
    receiving a generated predicted uniformity profile from the trained machine learning predictive model;
    determining that the generated predicted uniformity profile matches a target uniformity profile;
    directing a controller to process the semiconductor wafer;

receiving a measured uniformity of components on the processed semiconductor wafer;

determining whether the measured uniformity is within a tolerance limit; and upon determination that the measured uniformity profile is within the tolerance limit, determining that processing of the semiconductor wafer has completed.

12. The method of claim 11, wherein the process parameters include one or more of: the electrostatic chuck temperature, time of processing, type of gas, power, RF bias, pressure, or temperature in a processing chamber for the semiconductor wafer.

13. The method of claim 11, wherein the configuration for the electrostatic chuck comprises a distribution of temperature in one or more zones of the electrostatic chuck.

14. The method of claim 11, wherein the measured uniformity profile is a measured deposition layer thickness on the processed semiconductor wafer.

15. The method of claim 11, wherein the measured uniformity profile is a measured critical dimension uniformity on the processed semiconductor wafer.

16. The method of claim 11, wherein the measured uniformity profile is received from one or more metrology tools.

17. The method of claim 11, further comprising: upon determination that the measured uniformity profile is outside of the tolerance limit, refining at least one of the semiconductor wafer design data, the process parameters, or the configuration for the electrostatic chuck.

18. A processor-implemented method for processing a semiconductor wafer using a trained machine learning predictive model, the method comprising:

inputting, into a trained machine learning predictive model, at least one of: a semiconductor wafer design data or process parameters;

inputting, into the trained machine learning predictive model, a configuration for a plurality of RF field generators;

receiving a generated predicted uniformity profile from the trained machine learning predictive model;

determining that the generated predicted uniformity profile matches a target uniformity profile;

directing a controller to process the semiconductor wafer;

receiving a measured uniformity of components on the processed semiconductor wafer;

determining whether the measured uniformity is within a tolerance limit; and upon determination that the measured uniformity profile is within the tolerance limit, determining that processing of the semiconductor wafer has completed.

19. The method of claim 18, wherein the process parameters include one or more of: an electrostatic chuck temperature, time of processing, type of process gas, flow rate of process gas, power, RF bias, pressure, or temperature in a processing chamber for the semiconductor wafer.

20. The method of claim 18, wherein the configuration for the plurality of RF field generators comprises a distribution of RF bias generated in one or more of the plurality of RF field generators.

21. The method of claim 18, wherein the measured uniformity profile is a measured deposition layer thickness on the processed semiconductor wafer.

22. The method of claim 18, wherein the measured uniformity profile is a measured critical dimension uniformity on the processed semiconductor wafer.

23. The method of claim 18, wherein the measured uniformity profile is received from one or more metrology tools.

24. The method of claim 18, further comprising: upon determination that the measured uniformity profile is outside of the tolerance limit, refining at least one of the semiconductor wafer design data, the process parameters, or the configuration for the plurality of RF field generators.

25. A processor-implemented method for processing a semiconductor wafer using a trained machine learning predictive model, the method comprising:

inputting, into a trained machine learning predictive model, at least one of: a semiconductor wafer design data or process parameters;

inputting, into the trained machine learning predictive model, at least two of: a configuration for a RF field generator, a configuration for an electrostatic chuck, and a gas flow configuration for a pixelated showerhead;

receiving a generated predicted uniformity profile from the trained machine learning predictive model;

determining that the generated predicted uniformity profile matches a target uniformity profile;

directing a controller to process the semiconductor wafer;

receiving a measured uniformity of components on the processed semiconductor wafer;

determining whether the measured uniformity is within a tolerance limit; and upon determination that the measured uniformity profile is within the tolerance limit, determining that processing of the semiconductor wafer has completed.

* * * * *